(12) United States Patent
Li et al.

(10) Patent No.: US 12,229,881 B2
(45) Date of Patent: Feb. 18, 2025

(54) METHOD AND APPARATUS FOR GENERATING THREE-DIMENSIONAL FACE MODEL, COMPUTER DEVICE, AND STORAGE MEDIUM

(71) Applicant: TENCENT TECHNOLOGY (SHENZHEN) COMPANY LIMITED, Shenzhen (CN)

(72) Inventors: Wenpan Li, Shenzhen (CN); Linchao Bao, Shenzhen (CN); Xiangkai Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 255 days.

(21) Appl. No.: 17/707,937

(22) Filed: Mar. 29, 2022

(65) Prior Publication Data

US 2022/0222893 A1 Jul. 14, 2022

Related U.S. Application Data

(63) Continuation of application No. PCT/CN2020/125386, filed on Oct. 30, 2020.

(30) Foreign Application Priority Data

Jan. 16, 2020 (CN) .......................... 202010049667.6

(51) Int. Cl.
*G06T 17/00* (2006.01)
*G06T 3/60* (2024.01)
(Continued)

(52) U.S. Cl.
CPC ............... *G06T 17/00* (2013.01); *G06T 3/60* (2013.01); *G06T 7/40* (2013.01); *G06T 7/55* (2017.01);
(Continued)

(58) Field of Classification Search
CPC . G06T 2207/30201; G06T 2207/10028; G06T 2207/10024; G06T 17/00;
(Continued)

(56) References Cited

U.S. PATENT DOCUMENTS 10,796,480 B2 10/2020 Chen et al.
11,398,044 B2 7/2022 Ye
(Continued)

FOREIGN PATENT DOCUMENTS

CN 103778661 A 5/2014
CN 103971408 A 8/2014
(Continued)

OTHER PUBLICATIONS

The Japan Patent Office (JPO) Notification of Reasons for Refusal for Application No. 2022-520268 and Translation Jun. 5, 2023 4 Pages.
(Continued)

*Primary Examiner* — Xiao M Wu
*Assistant Examiner* — Scott E Sonners
(74) *Attorney, Agent, or Firm* — ANOVA LAW GROUP PLLC

(57) ABSTRACT

Embodiments of this application disclose a method and an apparatus for generating a three-dimensional face model. The method includes obtaining a plurality of target face images and a plurality of depth images corresponding to the plurality of target face images, the plurality of target face images comprising a same face; obtaining, according to an image type of each target face image, a regional face image that is in each target face image and that corresponds to the image type of each target face image, the image type comprising a front face type, a left face type, a right face type, or a head-up type; obtaining a regional depth image in a corresponding depth image according to the regional face
(Continued)

image; and performing image fusion based on the plurality of obtained regional face images and the plurality of obtained regional depth images, to generate a three-dimensional face model.

16 Claims, 11 Drawing Sheets

(51) Int. Cl.
| | |
|---|---|
| G06T 7/40 | (2017.01) |
| G06T 7/55 | (2017.01) |
| G06T 7/70 | (2017.01) |
| G06V 10/22 | (2022.01) |
| G06V 10/56 | (2022.01) |
| G06V 10/764 | (2022.01) |
| G06V 40/16 | (2022.01) |
| G06V 40/18 | (2022.01) |

(52) U.S. Cl.
CPC .............. *G06T 7/70* (2017.01); *G06V 10/225* (2022.01); *G06V 10/56* (2022.01); *G06V 10/764* (2022.01); *G06V 40/168* (2022.01); *G06V 40/172* (2022.01); *G06V 40/174* (2022.01); *G06V 40/18* (2022.01); *G06T 2200/08* (2013.01); *G06T 2207/10016* (2013.01); *G06T 2207/10024* (2013.01); *G06T 2207/10028* (2013.01); *G06T 2207/20221* (2013.01); *G06T 2207/30201* (2013.01); *G06T 2207/30208* (2013.01); *G06T 2210/56* (2013.01)

(58) Field of Classification Search
CPC ....... G06T 2200/08; G06T 2207/10016; G06T 7/55; G06T 2207/20221; G06T 2200/04; G06T 15/04; G06T 2207/30196; G06T 7/75; G06T 7/33; G06T 2219/2004; G06T 7/50; G06T 7/70; G06T 7/11; G06T 19/00; G06T 2215/16; G06T 15/205; G06T 19/006; G06T 1/0007; G06T 15/00; G06T 2207/20112; G06V 40/165; G06V 40/168; G06V 40/169; G06V 40/171; A61F 2300/5553
See application file for complete search history.

(56) References Cited

U.S. PATENT DOCUMENTS

| | | | |
|---|---|---|---|
| 2003/0169907 A1* | 9/2003 | Edwards | G06V 40/18 382/118 |
| 2013/0235033 A1 | 9/2013 | Kim et al. | |
| 2014/0204089 A1 | 7/2014 | Lim et al. | |
| 2018/0115717 A1 | 4/2018 | Kao et al. | |
| 2020/0105013 A1* | 4/2020 | Chen | G06V 40/166 |
| 2020/0258206 A1 | 8/2020 | Shen et al. | |
| 2020/0349731 A1* | 11/2020 | Ye | G06V 40/165 |

FOREIGN PATENT DOCUMENTS

| | | |
|---|---|---|
| CN | 105894047 A | 8/2016 |
| CN | 106327571 A | 1/2017 |
| CN | 107924579 A | 4/2018 |
| CN | 107993216 A | 5/2018 |
| CN | 109903368 A | 6/2019 |
| CN | 105894047 B | 8/2019 |
| CN | 110163953 A | 8/2019 |
| CN | 110363129 A | 10/2019 |
| CN | 110363858 A | 10/2019 |
| CN | 110378994 A | 10/2019 |
| CN | 110610546 A | 12/2019 |
| CN | 111210510 A | 5/2020 |
| CN | 112749611 A | 5/2021 |
| JP | 2000215311 A | 8/2000 |

OTHER PUBLICATIONS

The State Intellectual Property Office of the People's Republic of China (SIPO) Office Action 1 for for 202010049667.6 Apr. 19, 2021 15 Pages (including translation).
The World Intellectual Property Organization (WIPO) International Search Report for PCT/CN2020/125386 Jan. 7, 2021 7 Pages (including translation).
The European Patent Office (EPO) The Extended European Search Report for 20914245.4 Jan. 23, 2023 12 Pages (including translation).
Xiangkai Lin et al: "High-Fidelity 3D Digital Human Creation from RGB-D Selfies",arxiv.org, Cornell University Library, 201Olin Library Cornell University Ithaca, NY14853,Oct. 12, 2020 (Oct. 12, 2020), XP081784129.

* cited by examiner

METHOD AND APPARATUS FOR GENERATING THREE-DIMENSIONAL FACE MODEL, COMPUTER DEVICE, AND STORAGE MEDIUM

RELATED APPLICATIONS

This application is a continuation application of PCT Application No. PCT/CN2020/125386, filed on Oct. 30, 2020, which in turn claims priority to Chinese Patent Application No. 202010049667.6, entitled "METHOD AND APPARATUS FOR GENERATING THREE-DIMENSIONAL FACE MODEL, COMPUTER DEVICE, AND STORAGE MEDIUM" filed with the China National Intellectual Property Administration on Jan. 16, 2020. The two applications are incorporated herein by reference in their entirety.

FIELD OF THE TECHNOLOGY

Embodiments of this application relate to the field of computer technologies, and in particular, to a method and apparatus for generating a three-dimensional face model, a computer device, and a storage medium.

BACKGROUND OF THE DISCLOSURE

With the development of computer technologies, the three-dimensional face model is widely applied. The three-dimensional face model may be applied to many scenarios such as a game character construction scenario and a virtual character image construction scenario, and a three-dimensional face model of the user may be generated by using the face image of the user, facilitating usage of the user.

A method for generating a three-dimensional face model is provided in the related art, including obtaining a video of a target face, and fusing a plurality of face images included in the video, to generate a three-dimensional face model. Because the type of method is to fuse the plurality of face images in the video, a large amount of computation resources are required for the image fusion process, resulting in low efficiency in constructing the three-dimensional face model.

SUMMARY

Embodiments of this application provide a method and apparatus for generating a three-dimensional face model, a computer device, and a storage medium, which can improve the efficiency of constructing a three-dimensional face model. The technical solutions are as follows.

One aspect of the present disclosure provides a method for generating a three-dimensional face model. The method includes obtaining a plurality of target face images and a plurality of depth images corresponding to the plurality of target face images, the plurality of target face images comprising a same face, and the plurality of depth images comprising depth information corresponding to pixels in the target face images; obtaining, according to an image type of each target face image, a regional face image that is in each target face image and that corresponds to the image type of each target face image, the image type comprising a front face type, a left face type, a right face type, or a head-up type; obtaining a regional depth image in a corresponding depth image according to the regional face image; and performing image fusion based on the plurality of obtained regional face images and the plurality of obtained regional depth images, to generate a three-dimensional face model.

Another aspect of the present disclosure provides an apparatus for generating a three-dimensional face model. The apparatus includes a first image obtaining module, configured to obtain a plurality of target face images and a plurality of depth images corresponding to the plurality of target face images, the plurality of target face images comprising a same face, and the plurality of depth images comprising depth information corresponding to pixels in the target face images; a second image obtaining module, configured to obtain, according to an image type of each target face image, a regional face image that is in each target face image and that corresponds to the image type of each target face image, the image type comprising a front face type, a left face type, a right face type, or a head-up type; a third image obtaining module, configured to obtain a regional depth image in a corresponding depth image according to the regional face image in each target face image, a position of the regional face image corresponding to a position of the regional depth image; and a face model generation module, configured to perform image fusion according to the plurality of obtained regional face images and the plurality of obtained regional depth images, to generate a three-dimensional face model of the face.

Another aspect of the present disclosure provides a computer device, including a processor and a memory, the memory storing at least one computer program, the at least one computer program being loaded and executed by the processor to implement the method for generating a three-dimensional face model as described in the above aspect.

Another aspect of the present disclosure provides a non-transitory computer-readable storage medium is provided, storing at least one computer program, the computer program being loaded and executed by a processor to implement the method for generating a three-dimensional face model as described in the above aspect.

In the method and apparatus, a computer device, and a storage medium provided in the embodiments of this application, by obtaining a regional face image that is in each target face image and that matches an image type of each target face image, face images of other regions in the target face image are cropped, so that each obtained regional face image and a corresponding regional depth image include only a region matching the image type of each target face image, not including a region matching another image type, and an overlapping region between different regional face images is reduced. Image fusion is performed according to the plurality of obtained regional face images and the plurality of obtained regional depth images, and a calculation amount is small in a process of generating a three-dimensional face model, thereby improving the efficiency of constructing the three-dimensional face model.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of the embodiments of this application, and a person of ordinary skill in the art may still derive other accompanying drawings from the accompanying drawings without creative efforts.

DESCRIPTION OF EMBODIMENTS

Figure 1:
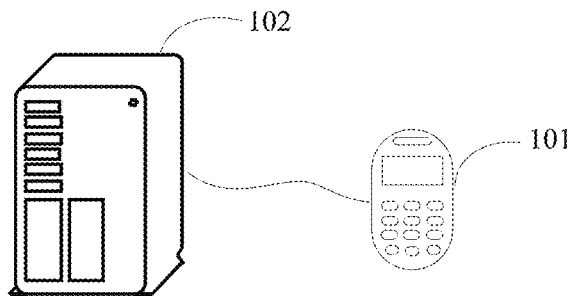
FIG. 1 is a schematic diagram of an implementation environment according to an embodiment of this application.

To make objectives, technical solutions, and advantages of the embodiments of this application clearer, the following further describes in detail implementations of this application with reference to the accompanying drawings.

The terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first face image may be referred to as a second face image, and similarly, the second face image may be referred to as the first face image.

For the terms "at least one", "a plurality of", "each", and "any" used in this application, "at least one" refers to "one", "two", or "more", "a plurality of" refers to "two" or "more", "each" refers to "each of a plurality of corresponding", and "any" refers to "any one of a plurality of". For example, when "a plurality of elements" refers to "three elements", "each" refers to "each of the three elements", and "any" refers to "any one of the three elements", that is, may be the first element, the second element, or the third element.

For ease of understanding the technical solutions in the embodiments of this application, some terms involved in the embodiments of this application are explained below.

Color depth (red, green, and blue-depth, RGB-D) image sequence: An RGB image sequence with color information acquired by a depth camera and a depth image sequence with depth information. An RGB image is used for extracting texture information of a three-dimensional model, and a depth image is used for obtaining three-dimensional information.

Perspective-n-Point (PnP, computer vision): In a world coordinate system, three-dimensional coordinates of n space points and two-dimensional projections of these space points on an image are known to solve a camera posture, which is used for calculating a posture angle of rotation of a face in the embodiments of this application.

Random sample consensus (RANSAC): A random sample consensus algorithm that estimates parameters of a mathematical model iteratively from an observation data set including "outliers".

Iterative closest point (ICP): An ICP algorithm is a point cloud matching algorithm. The algorithm calculates a spatial transformation relationship between two point clouds through iteration, so that the two point clouds are converted into the same coordinate system for registration and alignment.

Singular value decomposition (SVD): An important method for decomposing matrices in linear algebra to obtain a left singular matrix, a Sigma (covariance) matrix, and a right singular matrix.

Surfel (point element) model: A three-dimensional point cloud data model, in which each point cloud stores position information of a point, a radius of a patch, a normal vector, color information, and a time of obtaining point cloud data.

A method for generating a three-dimensional face model provided in the embodiments of this application can be applied to a computer device. In one embodiment, the computer device is a terminal. In some embodiments, the terminal is a variety of types of terminals such as a mobile phone, a computer, and a tablet computer.

The terminal obtains a plurality of target face images and a plurality of corresponding depth images by capturing a face by a depth camera, and determines a plurality of regional face images and a plurality of regional depth images according to the plurality of target face images and the plurality of corresponding depth images, to generate a three-dimensional face model of the face according to the plurality of regional face images and the plurality of regional depth images.

In another embodiment, the computer device includes a server and a terminal. FIG. 1 is a schematic structural diagram of an implementation environment according to an embodiment of this application. As shown in FIG. 1, a terminal 101 and a server 102 are included in the implementation environment. The terminal 101 establishes a communication connection with the server 102, and interacts with the server 102 through the established communication connection.

In some embodiments, the terminal 101 is a variety of types of terminals 101 such as a mobile phone, a computer, and a tablet computer. In some embodiments, the server 102 is a server, or a server cluster that includes a plurality of servers, or a cloud computing service center.

The terminal 101 obtains a plurality of target face images and a plurality of corresponding depth images by capturing a face by a depth camera, and transmits the plurality of target face images and the plurality of corresponding depth images to the server 102. The server 102 determines a plurality of regional face images and a plurality of regional depth images according to the plurality of target face images and the plurality of corresponding depth images that are received, to generate a three-dimensional face model of the face according to the plurality of regional face images and the plurality of regional depth images. The server 102 transmits the generated three-dimensional face model to the terminal 101, and the terminal 101 displays the three-dimensional face model for a user to use.

The method provided in this embodiment of this application may be used to construct a three-dimensional face model in various scenarios to be applied to interactive entertainment needs in different scenarios. For example, a three-dimensional face model of a face can be accurately constructed in scenarios such as a game scenario and a publicity release scenario, which are used to construct realistic game character attributes. In daily conversations and exchanges, the constructed three-dimensional face model is used to customize exclusive emojis to enhance the fun of chatting. In some embodiments, the constructed three-dimensional face model is further widely applied to entertainment scenarios such as a virtual makeup scenario, a virtual fitting scenario, and a virtual character image scenario.

For example, in a simulation game character setting scenario:

In a game scenario interface displayed on a terminal, the user clicks a simulation game character setting button to enable a depth camera of the terminal, and the face of the user is captured by the depth camera, to obtain a plurality of face images and corresponding depth images. The terminal then generates, by using a method for generating a three-dimensional face model provided in the embodiments of this application, a three-dimensional face model of the face according to the plurality of obtained target face images and the plurality of corresponding depth images, and displays the three-dimensional face model in the game scenario interface of the terminal, so that the user can use the three-dimensional face model as a face of a simulation game character through the game scenario interface.

Figure 2:
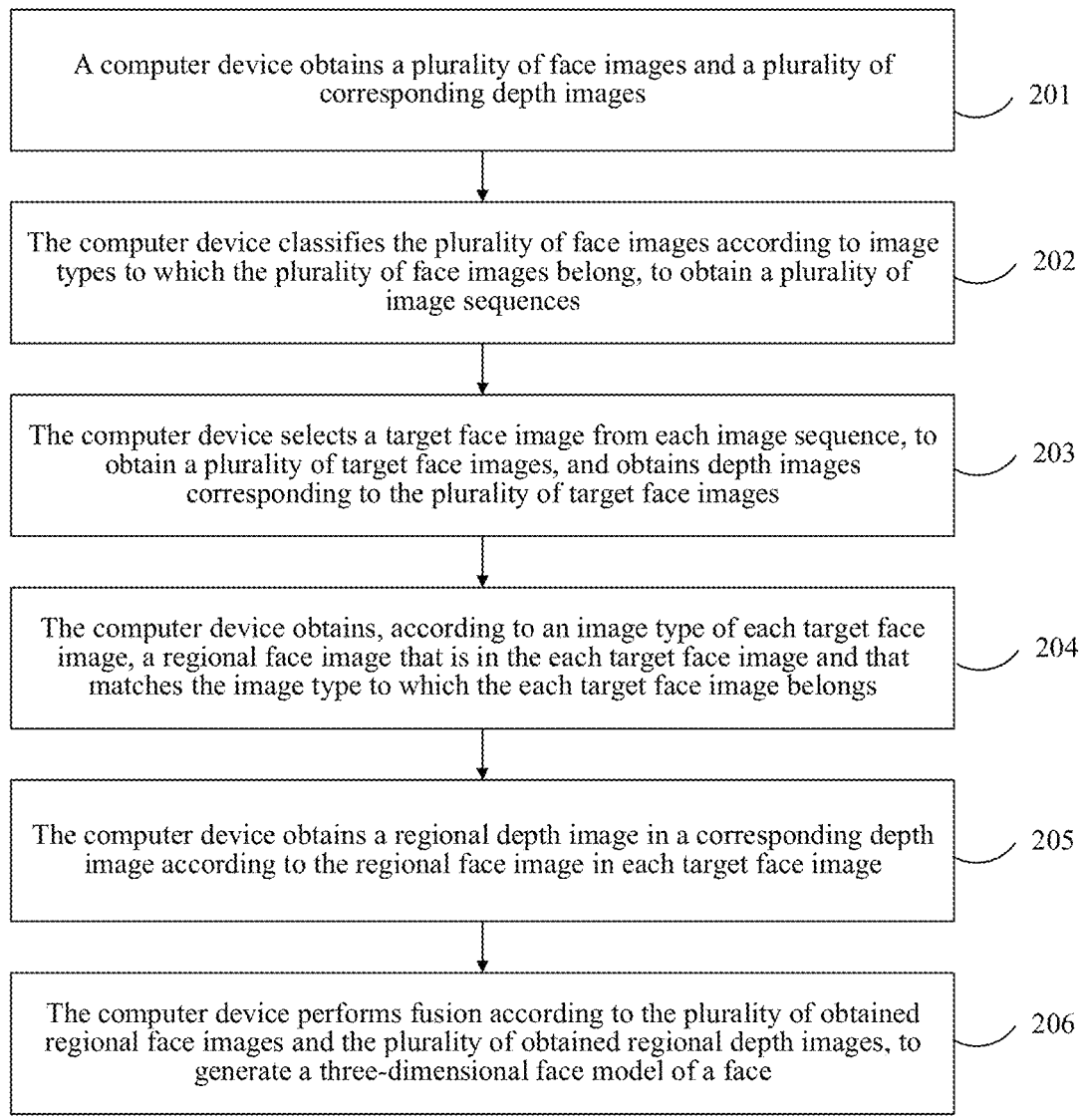
FIG. 2 is a flowchart of a method for generating a three-dimensional face model according to an embodiment of this application.

FIG. 2 is a flowchart of a method for generating a three-dimensional face model according to an embodiment of this application, applied to a computer device. As shown in FIG. 2, the method includes the following steps:

201. A computer device obtains a plurality of face images and a plurality of corresponding depth images.

In some embodiments, the face image and the corresponding depth image are obtained by capturing a face with a depth camera. The face image is an RGB three-channel color image including a face, and the depth image is an image including depth information of pixels in the corresponding face image. Each pixel in the face image corresponds to a position point of the face. The depth information of any pixel can be expressed as a distance between a position of the face corresponding to the pixel and a position of the depth camera, so that a distance between the position of the depth camera and any point on the face can be determined in the real space according to the depth information in the depth image. The plurality of face images include the same face. In some embodiments, in the plurality of face images, the orientation of the face is different. For example, the orientation of the face is that the face faces a front direction, the face faces the left, the face faces the right, and the face faces upward. The plurality of face images are of a one-to-one correspondence with the plurality of depth images.

In one embodiment, step 201 includes that the computer device captures the face by using the depth camera, and obtains the plurality of face images and the plurality of corresponding depth images. The depth camera is configured to obtain the face image and the corresponding depth image. When the computer device captures the face by using the depth camera, the obtained face image and depth image are a one-to-one correspondence.

In some embodiments, the depth camera includes a camera and a depth sensor. When the depth camera captures a face, a face image can be captured by the camera, and a depth image corresponding to the face image can be obtained by the depth sensor. For example, a mobile phone includes a camera and a depth sensor. When a user clicks a camera button of the mobile phone to take a picture of the face of the user, a face image is obtained by using the camera, and a depth image corresponding to the face image is obtained by the depth sensor.

In some embodiments, when the computer device captures a face, the face rotates in a preset order, so that the computer device captures a plurality of pictures. In some embodiments, the preset order is that an initial position is that the front of the face faces the computer device, the face is turned to the left, the face is turned to the right to return to the initial position, the face is turned to the right, the face is turned to the left to return to the initial position, and the face is raised up. During the rotation of the face, the computer device captures the face, and can obtain a plurality of face images and a plurality of corresponding depth images. In some embodiments, the computer device captures a video of a face, or captures a face at a preset capturing interval, for example, the preset capturing interval is 1 second.

Figure 3:
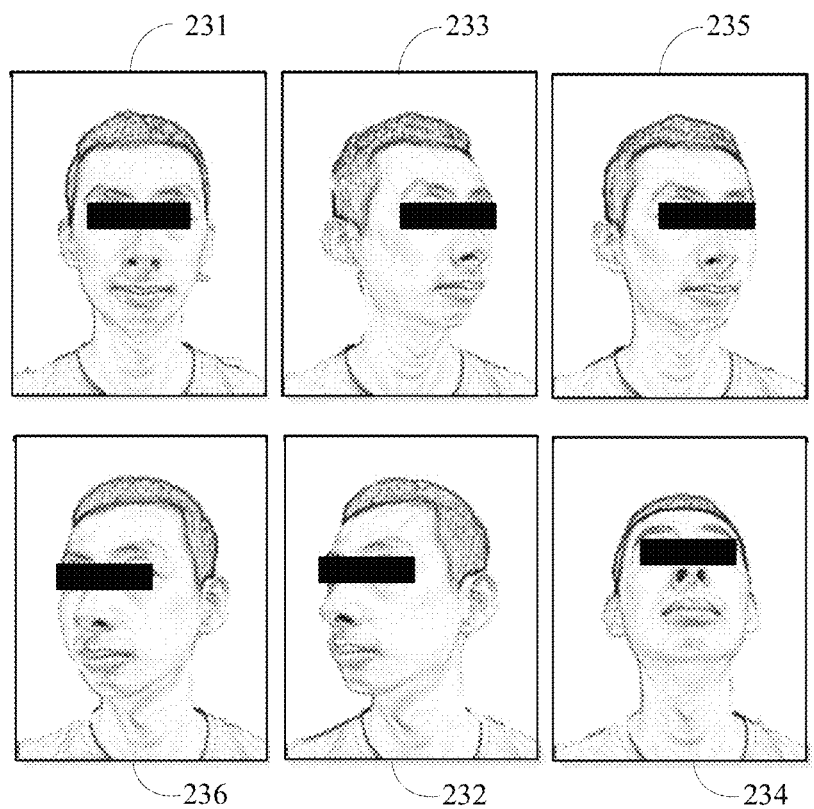
FIG. 3 is a schematic diagram of a face image sequence according to an embodiment of this application.

In some embodiments, the plurality of face images and the plurality of corresponding depth images obtained by the computer device are used as an RGB-D image sequence. As shown in FIG. 3, the plurality of face images is an RGB-D image sequence including an RGB image sequence with color information, which includes a face image 231, a face image 232, a face image 233, a face image 234, a face image 235, and a face image 236, and the plurality of depth images are an RGB-D image sequence including a depth image sequence with depth information.

202. The computer device classifies the plurality of face images according to image types of the plurality of face images, to obtain a plurality of image sequences.

The face images are classified into a plurality of image types according to different face orientations. The image types include a front face type, a left face type, a right face type, or a head-up type. A face in a face image that belongs to the front face type faces a front direction. A face in a face image that belongs to the left face type faces the right side of the face. A face in a face image that belongs to the right face type faces the left side of the face. A face in a face image that belongs to the head-up type faces upwards. As shown in FIG. 3, the face image 231 belongs to the front face type, the face image 232 and the face image 236 belong to the left face type, the face image 233 and the face image 235 belong to the right face type, and the face image 234 belongs to the head-up type.

Each image sequence includes at least one face image, and each image sequence includes face images of the same image type. After obtaining the plurality of face images, the computer device determines the image types of the plurality of face images, and classifies the face images that of the plurality of face images and that belong to the same image type into an image sequence, so that the plurality of obtained image sequences include at least one of a front face image sequence, a left face image sequence, a right face image sequence, and a head-up image sequence.

For determining the image types of the plurality of face images, in one embodiment, the computer device performs marker point detection on the plurality of face images, to determine at least one marker point included in each face image. For a face image, when the number of marker points in the face image matching an image type exceeds a preset threshold, it is determined that the face image to said image type; or, for a face image, the number of marker points in the face image matching each image type is determined, and an image type with the largest number of matched marker points is determined as the image type of the face image.

Figure 4:
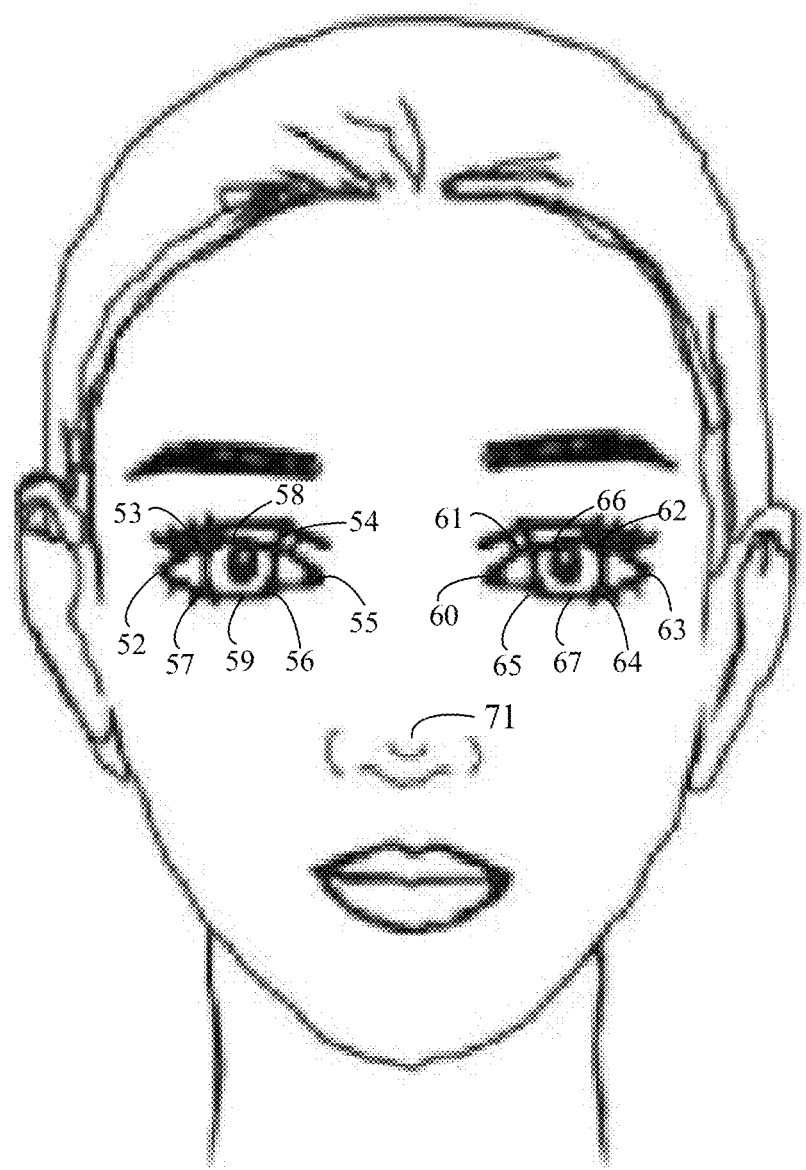
FIG. 4 is a schematic diagram of a face image according to an embodiment of this application.

In some embodiments, each face image includes at least one marker point, and each marker point indicates a position of the face. In a plurality of marker points, different marker points indicate different positions of the face. As shown in FIG. 4, the face image includes a plurality of marker points such as marker points 52 to 59, marker points 60 to 67, and a marker point 71. Each marker point is located at a different position of the face. For example, the marker point 71 indicates a position of the nose tip of the face, and the marker point 60 indicates a position of the right canthus of the right eye on the face. Different marker points indicate different positions of the face. Therefore, the image types matching the different marker points can be set.

In some embodiments, for the face image of the front face type, marker points indicating the nose tip, the eye region, and the lips region of the face are set to marker points that match the front face type; and for the face image of the left face type, marker points indicating a plurality of positions of the left face are set to marker points that match the left face type. The computer device can determine the marker points included in each face image by performing marker point detection according to the face included in each face image, and subsequently, can determine, according to the image type matched by the marker points included in each face image, the image type of each face image.

In some embodiments, the computer device performs marker point detection on the plurality of face images by using a marker point detection model, to determine the marker points included in the face images. In some embodiments, the marker point detection model is a convolutional neural network model, which is obtained after a large number of samples are trained.

In another embodiment, according to an order in which the plurality of face images are obtained, the computer device determines a first face image as the front face image and determines the remaining face images in the plurality of face images as face images of the image types to be determined; performs marker point detection on the plurality of face images, to determine at least one marker point included in each face image; determines, for any one of the face images, a preset number of target marker points included in both the face image and the front face image, and determines a posture angle difference between the face image and the front face image by using coordinates of the target marker points in the face image and coordinates of the target marker points in the front face image; and determines, according to a posture angle difference corresponding to each face image, an image type of each face image.

The plurality of face images are sequentially obtained in a chronological order. When the face starts to be imaged, the front of the face faces the depth camera, and the first obtained face image is a front face image.

Figure 5:
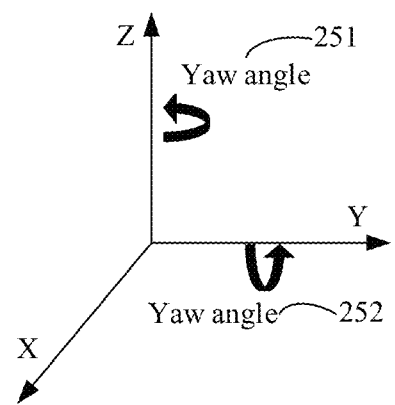
FIG. 5 is a schematic diagram of a coordinate system according to an embodiment of this application.

The posture angle difference includes a yaw angle difference or a pitch angle difference. As shown in FIG. 5, the front of the face faces a positive direction of an X axis, a rotation angle of the face around a Z axis is a yaw angle 251, and a rotation angle of the face around a Y axis is a pitch angle 252. In some embodiments, the yaw angle difference and the pitch angle difference are both positive or negative numbers. In response to the yaw angle difference corresponding to the face image being a positive number, the face image is determined to belong to the left face type. In response to the yaw angle difference corresponding to the face image being a negative number, the face image is determined to belong to the right face type. In response to the pitch angle difference corresponding to the face image being a positive number, the face image is determined to belong to the head-up type. For example, if the face turns to the right, a left face region of the face is displayed in a captured face image, and a yaw angle difference between the face image and the front face image is a positive number. If the face turns to the left, a right face region of the face is displayed in a captured face image, and a yaw angle difference between the face image and the front face image is a negative number. If the face is raised up, a chin region and a neck region of the face is displayed in a captured face image, and a pitch angle difference between the face image and the front face image is a positive number.

When the posture angle difference is determined, in some embodiments, according to coordinates of target marker points with the same serial number in the face image and the front face image, a rotation matrix between the face image and the front face image are determined, and the rotation matrix is converted into an angle as the posture angle difference between the face image and the front face image. In some embodiments, a posture angle difference between a face image that is to be determined and the front face image is calculated by using a PnP algorithm.

In addition, the preset number is set by the computer device. For example, the preset number is 10. In some embodiments, if the number of marker points jointly included between the face image that is to be determined and the front face image is greater than the preset number, a random algorithm such as a RANSAC algorithm is used to determine the preset number of target marker points from the marker points jointly included between the face image that is to be determined and the front face image.

203. The computer device selects a target face image from each image sequence, to obtain a plurality of target face images, and obtains depth images corresponding to the plurality of target face images.

Each image sequence includes face images of the same image type, the face included in the face images of the same image type has an overlapping region. Therefore, a target face image is selected from each image sequence, and the plurality of target face images can be obtained from a plurality of image sequences, so that a three-dimensional face model can be subsequently generated by using the plurality of target face images obtained through selection, thereby improving the efficiency of generating the three-dimensional face model. In some embodiments, the plurality of target face images include a face image of the head-up type, so that the subsequently generated three-dimensional face model can include a chin region and a neck region of the face.

Figure 6:
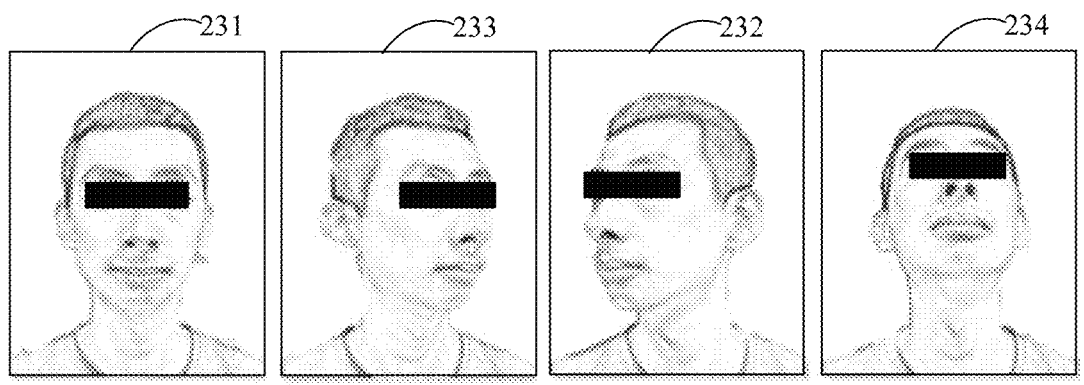
FIG. 6 is a schematic diagram of a plurality of target face images according to an embodiment of this application.

In addition, in the plurality of image sequences, different image sequences correspond to different image types, so that different target face images in the plurality of obtained target face images belong to different image types. As shown in FIG. 6, the plurality of target face images include a face image 231 belonging to the front face type, a face image 232 belonging to the left face type, a face image 233 belonging to the right face type, and a face image 234 belonging to the head-up type.

Figure 7:
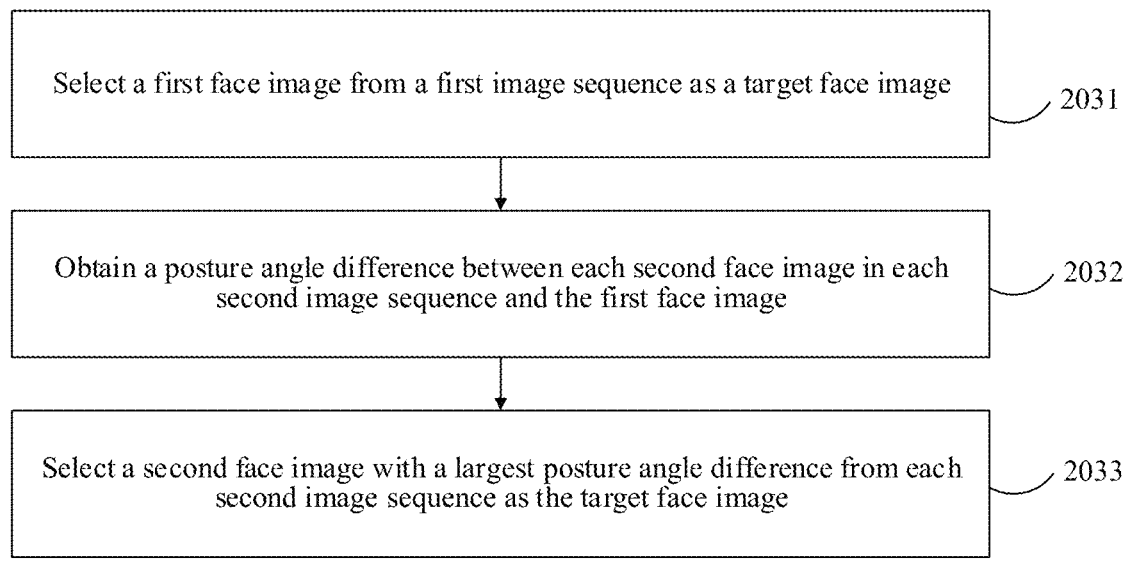
FIG. 7 is a flowchart of a method for generating a three-dimensional face model according to an embodiment of this application.

In one embodiment, a process of selecting a target face image in an image sequence by the computer device is shown in FIG. 7, including the following steps 2031 to 2033:

2031. Select a first face image from a first image sequence as the target face image.

In this embodiment of this application, the plurality of image sequences include at least a first image sequence corresponding to the front face type and second image sequences corresponding to other image types. In some embodiments, all the first face images in the first image sequence are the front face type, and a first face image is randomly selected from the first image sequence as the target face image; or the first face images in the first image sequence are arranged in an order of capturing time, and a first face image captured at the earliest capturing time is used as the target face image.

2032. Obtain a posture angle difference between each second face image in each second image sequence and the first face image.

The description of the posture angle difference in step 2032 is similar to the description of the posture angle difference in step 202, and details are not described herein again. In addition, a method of obtaining the posture angle difference in step 2032 may also be similar to a method of obtaining the posture angle difference in step 202, and details are not described herein again.

In one embodiment, step 2032 includes: determining, for a second face image, at least one second marker point in the second face image and at least one second marker point in the first face image that have a same serial number; obtaining a rotation and translation matrix between the first face image and the second face image according to coordinates of the at least one second marker point in the first face image and coordinates of the at least one second marker point in the second face image; and converting the rotation and translation matrix, to obtain a posture angle difference between the second face image and the first face image.

In some embodiments, each face image includes a plurality of marker points, each marker point indicates a position of the face, and different marker points indicate different positions of the face. Therefore, the plurality of marker points are set with different serial numbers, and a corresponding marker point can be determined according to any one of the serial numbers. For example, as shown in FIG. 4, the marker point 71 indicates the position of the nose tip of the face, and the marker point 60 indicates the position of the right canthus of the right eye on the face.

Because coordinates of the at least one second marker point in the first face image and the second face image are different, according to the coordinates of the at least one second marker point in the first face image and the coordinates of the at least one second marker point in the second face image, a rotation and translation matrix used for converting the coordinates of the at least one second marker point in the first face image into the coordinates of the at least one second marker point in the second face image can be determined, or, a rotation and translation matrix used for converting the coordinates of the at least one second marker point in the second face image into the coordinates of the at least one second marker point in the first face image can be determined. The rotation and translation matrix is converted into an angle, and the angle is used as the posture angle difference between the second face image and the first face image.

In some embodiments, the number of selected second marker points is a preset number of second marker points, which is similar to the preset number of target marker points in step 202, and details are not described herein again.

In another embodiment, step 202 includes: determining, for a second face image, a marker point set S in the second face image, and a marker point set M in the first face image; randomly selecting a preset number of marker points from the marker point set S, to obtain a marker point set S', and randomly selecting a preset number of marker points from the marker point set M, to obtain a marker point set M', the marker points in the marker point set S' being of a one-to-one correspondence with the marker points in the marker point set respectively determining a centroid $\mu_s$ and a centroid $\mu_m$ of the marker point set S' and the marker point set M'; respectively subtracting coordinates of the corresponding centroid $\mu_s$ and centroid $\mu_m$ from coordinates of the marker points in the marker point set S' and the marker point set M', to obtain a new marker point set s' and a new marker point set m', where the marker point set S', the marker point set M', the marker point set s', and the marker point set m' satisfy the following relationship:

$$\begin{cases} m' = M' - \mu_m \\ s' = S' - \mu_s \end{cases}$$

A matrix W is constructed by using the marker point set s' and the marker point set m', the matrix W is decomposed, to obtain a matrix U and a matrix V. The marker point set s', the marker point set m', the matrix W, the matrix U, and the matrix V satisfy the following relationship:

$$\begin{cases} W = m'^*(s')^T \\ W = U \wedge V^T \end{cases}$$

A rotation matrix R between the first face image and the second face image is obtained by using the matrix U and the matrix V. A translation matrix t between the first face image and the second face image is obtained by using the rotation matrix R, the centroid $\mu_s$, and the centroid $\mu_m$. The matrix U, the matrix V, the rotation matrix R, the translation matrix t, the centroid $\mu_s$, and the centroid $\mu_m$ satisfy the following relationship:

$$\begin{cases} R = U^*V^T \\ t = \mu_s - R^*\mu_m \end{cases}$$

The rotation matrix R and the translation matrix t are fused to obtain the rotation and translation matrix, and the rotation and translation matrix is converted to obtain the posture angle difference between the second face image and the first face image. T in the formula is used for indicating that a matrix is transposed to obtain a transposed matrix of the matrix. For example, a transposed matrix of the matrix V is $V^T$. In some embodiments, in the above process, the posture angle difference between the second face image and the first face image is obtained by using the RANSAC algorithm and an ICP algorithm.

2033. Select a second face image with a largest posture angle difference from each second image sequence as the target face image.

Because the first face image to the front face type, the second face image to another image type such as the left face type or the right face type, a larger posture angle difference between the second face image and the first face image indicates that a region that matches the image type of the second face image and that is included in the second face image is more complete, and the subsequently generated three-dimensional face model is more accurate. Therefore, the second face image with the largest posture angle difference is selected from each second image sequence as the target face image. For example, a face region corresponding to the left face type is the left face, posture angle differences between two second face images of the left face type and the first face image are respectively 20 degrees and 30 degrees, and the left face displayed in the second face image with the posture angle difference of 30 degrees is more complete than the left face displayed in the second face image with the posture angle difference of 20 degrees. Therefore, the second face image with the posture angle difference of 30 degrees is selected as the target face image.

In this embodiment of this application, the target face image is determined by dividing the plurality of obtained face images into the plurality of image sequences. However, in another embodiment, the method may further include: obtaining the plurality of face images and the plurality of corresponding depth images; and determining a face image in an unblinking state in the plurality of face images as the target face image according to an eye status of the face image, the eye status including a blinking state or the unblinking state.

Because features of an eye region in the face included in the face image that is in the blinking state are incomplete, if the face image in the blinking state is used to generate a three-dimensional face model, the accuracy of the three-dimensional face model is poor. Therefore, a face image that is in the unblinking state needs to be sifted before the three-dimensional face model is generated, so as to generate the three-dimensional face model subsequently.

In some embodiments, determining the eye status of the face image further includes: determining, for a face image, an upper eyelid marker point, a lower eyelid marker point, a left canthus marker point, and a right canthus marker point of a target eye region in the face image; determining a first distance between the upper eyelid marker point and the lower eyelid marker point, and a second distance between the left canthus marker point and the right canthus marker point; determining a ratio of the first distance to the second distance as an eye aspect ratio of the target eye region; determining that the face image is in the blinking state in response to the eye aspect ratio being less than an eye aspect ratio threshold; and determining that the face image is in the unblinking state in response to the eye aspect ratio being not less than the eye aspect ratio threshold.

In some embodiments, the target eye region is a left eye region or a right eye region, where the left eye region refers to an eye region on the left side of the face image, including the right eye on the face; and the right eye region refers to an eye region on the right side of the face image, including the left eye on the face. The eye aspect ratio is used for representing a degree of eye opening and closing, and the eye status of the eye region can be determined by using the eye aspect ratio. In some embodiments, the eye aspect ratio threshold is preset according to eye aspect ratios of a plurality of eye regions in the face; or is determined according to the eye aspect ratios of the eye regions in the plurality of face images. A process of determining the upper eyelid marker point, the lower eyelid marker point, the left canthus marker point, and the right canthus marker point is similar to the process of determining the marker point in step 202, and details are not described herein again.

The first distance can be determined according to coordinates of the upper eyelid marker point and coordinates of the lower eyelid marker point, and the second distance can be determined according to coordinates of the left canthus marker point and coordinates of the right canthus marker points. The eye aspect ratio of the target eye region can be determined according to the first distance and the second distance, and the eye status of the face image can be determined according to the eye aspect ratio and the eye aspect ratio threshold. In a case of determining the eye status of the face image, in response to any of the left eye region and the right eye region being in the blinking state, the face image is determined to be in the blinking state; and in response to both the left eye region and the right eye region being in the unblinking state, the face image is determined to be in the unblinking state.

In some embodiments, a mean value of eye aspect ratios corresponding to the plurality of face images is obtained as the eye aspect ratio threshold. Eye aspect ratio thresholds of eye regions in different faces are different. Therefore, in a case of determining an eye aspect ratio threshold of a current face, the eye aspect ratio threshold needs to be determined according to eye aspect ratios of a plurality of face images of the current face, so that the obtained eye aspect ratio threshold matches the current face, thereby improving the accuracy of the determined eye status of the face image. In addition, for a plurality of face images of any face, eye statuses of the face images may be different, so that eye aspect ratios corresponding to the face images may be different, and a mean value of the eye aspect ratios corresponding to the plurality of face images is used as an eye aspect ratio threshold of this face, so that the obtained eye aspect ratio threshold matches the face, thereby improving the accuracy of the determined eye status of the face image.

In some embodiments, when the eye statuses of the plurality of face images are determined, eye aspect ratio thresholds of left eye regions and eye aspect ratio thresholds of right eye regions in the plurality of face images are respectively determined, so that eye statuses of the left eye regions in the plurality of face images can be determined according to the eye aspect ratio thresholds of the left eye regions, and eye statuses of the right eye regions in the plurality of face images can be determined according to the eye aspect ratio thresholds of the right eye regions subsequently. In the same face, the eye aspect ratio threshold of the left eye region is different from the eye aspect ratio threshold of the right eye region. Therefore, the eye aspect ratio thresholds of the left eye regions and the eye aspect ratio thresholds of the right eye regions in the plurality of face images are respectively determined, to accurately determine the eye status of the face image subsequently, thereby improving the accuracy of the eye status of the determined face image.

In some embodiments, when the upper eyelid marker point and the lower eyelid marker point in the target eye region are determined, a plurality of upper eyelid marker points and a plurality of lower eyelid marker points are determined. The plurality of upper eyelid marker points are of a one-to-one correspondence with the plurality of lower eyelid marker points. For example, as shown in FIG. 4, serial numbers of the upper eyelid marker points are 53, 54, and 58, serial numbers of the lower eyelid marker points are 57, 56, and 59, the serial number 53 corresponds to the serial number 57, the serial number 54 corresponds to the serial number 56, and the serial number 58 corresponds to the serial number 59.

In some embodiments, in the target eye region in the face image, coordinates $l_1$ of an upper eyelid marker point 1, coordinates $l_2$ of an upper eyelid marker point 2, and coordinates $l_3$ of an upper eyelid marker point 3 in the plurality of upper eyelid marker points are determined, coordinates $l_4$ of a lower eyelid marker point 4, coordinates $l_5$ of a lower eyelid marker point 5, and coordinates $l_6$ of a lower eyelid marker point 6 in the plurality of lower eyelid marker points are determined, coordinates of a left canthus marker point 7 are $l_7$, and coordinates of a right canthus marker point 8 are $l_8$. An eye aspect ratio d of the target eye region in the face image can be determined by using the coordinates $l_1$, $l_2$, $l_3$, $l_4$, $l_5$, $l_6$, $l_7$, and $l_8$. The coordinates $l_1$, $l_2$, $l_3$, $l_4$, $l_5$, $l_6$, $l_7$, and $l_8$ and the eye aspect ratio d satisfy the following relationship:

$$d = \frac{\|l_1 - l_4\|_2 + \|l_2 - l_5\|_2 + \|l_3 - l_6\|_2}{\|l_7 - l_8\|_2}$$

where $\|l_1 - l_4\|_2$ is a two-norm of a vector formed by the upper eyelid marker point 1 and the upper eyelid marker point 2, that is, a sum of squares of the vector is calculated and extraction of square root is performed, which is used for indicating a distance between the upper eyelid marker point 1 and the upper eyelid marker point 2, $\|l_2-l_5\|_2$ is used for indicating a distance between the upper eyelid marker point 2 and the lower eyelid marker point 5, $\|l_3-l_6\|_2$ is used for indicating a distance between the upper eyelid marker point 3 and the lower eyelid marker point 6, and $\|l_7-l_8\|_2$ is used for indicating a distance between the left canthus marker point 7 and the right canthus marker point 8.

For example, as shown in FIG. 4, the target eye region is a left eye region. In the left eye region, serial numbers of a plurality of upper eyelid marker points are 53, 54, and 58, serial numbers of a plurality of lower eyelid marker points are 56, 57, and 59, a left canthus marker point is 55, a right canthus marker point is 52, an eye aspect ratio threshold of the left eye region is $D_1$, and the left eye region in the face image is determined to be in the blinking state when the left eye region in the face image satisfies the following formula:

$$d = \frac{\|l_{58} - l_{59}\|_2 + \|l_{53} - l_{57}\|_2 + \|l_{54} - l_{56}\|_2}{\|l_{52} - l_{55}\|_2} < D_1.$$

For example, as shown in FIG. 4, the target eye region is a right eye region. In the right eye region, serial numbers of a plurality of upper eyelid marker points are 61, 62, and 66, serial numbers of a plurality of lower eyelid marker points are 64, 65, and 67, a left canthus marker point is 63, a right canthus marker point is 60, an eye aspect ratio threshold of the right eye region is $D_2$, and the right eye region in the face image is determined to be in the blinking state when the right eye region in the face image satisfies the following formula:

$$d = \frac{\|l_{66} - l_{67}\|_2 + \|l_{61} - l_{65}\|_2 + \|l_{62} - l_{64}\|_2}{\|l_{60} - l_{63}\|_2} < D_2.$$

In another embodiment, when the target face image is determined, a method of determining the target face image by dividing the plurality of obtained face images into the plurality of image sequences is combined with a method of determining the target face image by using the eye statuses of the plurality of obtained face images.

204. The computer device obtains, according to an image type of each target face image, a regional face image that is in each target face image and that matches the image type of each target face image.

The regional face image is a face image of a partial region in the face image. For example, a regional face image matching the front face type includes a front face region of a face, a regional face image matching the left face type includes a left face region of the face, a regional face image matching the right face type includes a right face region of the face, and a regional face image matching the head-up type includes a chin region and a neck region of the face.

In one embodiment, step 204 includes: selecting, from a plurality of marker points in a target face image, at least one first marker point matching an image type of the target face image; and obtaining a regional face image formed by the at least one first marker point from the target face image. Because a matching image type is set for each marker point, at least one first marker point matching the image type in the target image can be determined. The description of setting a matching image type for each marker point is similar to the description in step 202, and details are not described herein again.

In some embodiments, when determining the regional face image, edge point detection is performed on the at least one first marker point, to determine a plurality of edge points. The plurality of edge points are connected to form an enclosed region, and a face image corresponding to the enclosed region is used as the regional face image. Except for the plurality of edge points of the at least one first marker point, the remaining first marker points are all in the enclosed region.

205. The computer device obtains a regional depth image in a corresponding depth image according to the regional face image in each target face image.

Figure 8:
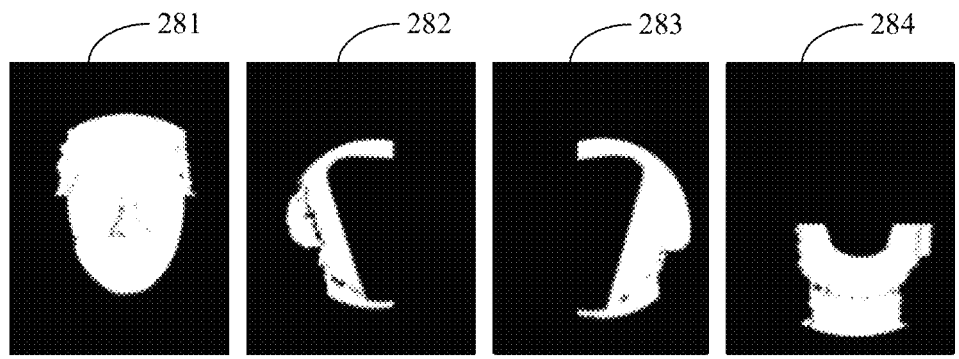
FIG. 8 is a schematic diagram of a plurality of regional depth images according to an embodiment of this application.

Because pixels in each target face image are of a one-to-one correspondence with pixels in the corresponding depth image, after the regional face image in the target face image is determined, the regional depth image can be determined from the depth image. A position of the regional face image matches a position of the regional depth image. The regional depth image includes depth information of the pixels in the corresponding regional face image. As shown in FIG. 8, a plurality of regional depth images are included in FIG. 8. An image type corresponding to a regional depth image 281 is the front face type, an image type corresponding to a regional depth image 282 is the left face type, an image type corresponding to a regional depth image 283 is the right face type, and an image type corresponding to a regional depth image 284 is the head-up type.

206. The computer device performs image fusion according to the plurality of obtained regional face images and the plurality of obtained regional depth images, to generate the three-dimensional face model of the face.

Because each pixel in each regional face image includes a corresponding color, and each regional depth image includes the depth information of each pixel in the corresponding regional face image, a skin color and contour of the face can be obtained by using the plurality of regional face images and the plurality of regional depth images, thereby generating the three-dimensional face model of the face.

In some embodiments, the plurality of regional face images include a regional face image corresponding to the head-up type, so that the generated three-dimensional face model can include a chin region and a neck region of the face.

Figure 9:
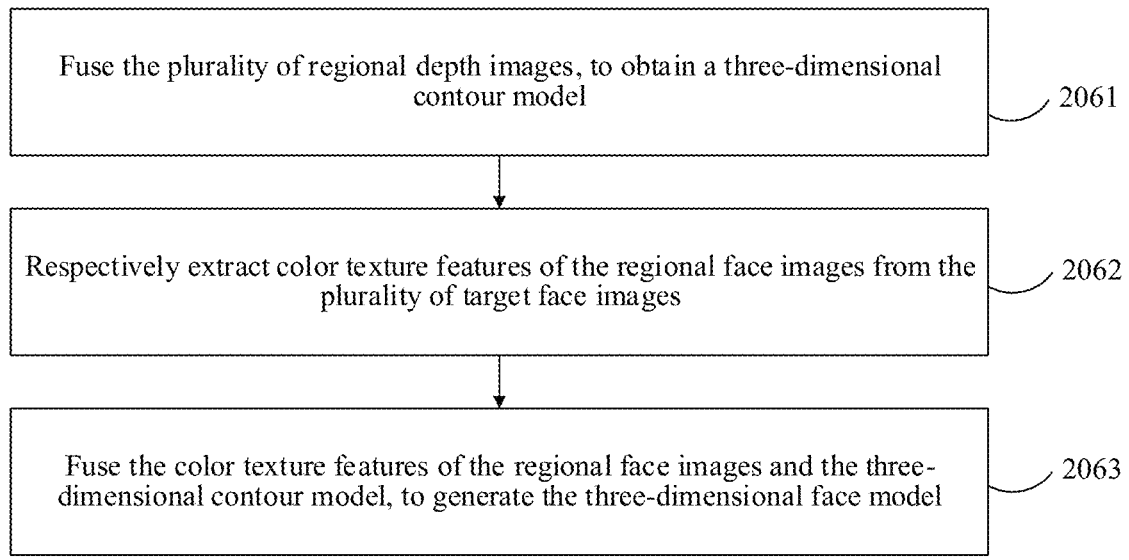
FIG. 9 is a flowchart of a method for generating a three-dimensional face model according to an embodiment of this application.

In one embodiment, as shown in FIG. 9, step 206 includes the following steps 2061 to 2063:

2061. Fuse the plurality of regional depth images, to obtain a three-dimensional contour model.

Because each regional depth image includes the depth information of each pixel in the corresponding regional face image, the contour of the face can be obtained by using the plurality of regional depth images, thereby obtaining the three-dimensional contour model of the face.

In one embodiment, step 2061 includes: converting the regional depth images corresponding to the target face images into point cloud data according to focal length values corresponding to the target face images; and fusing the point cloud data corresponding to the target face images, to obtain the three-dimensional contour model.

Figure 10:
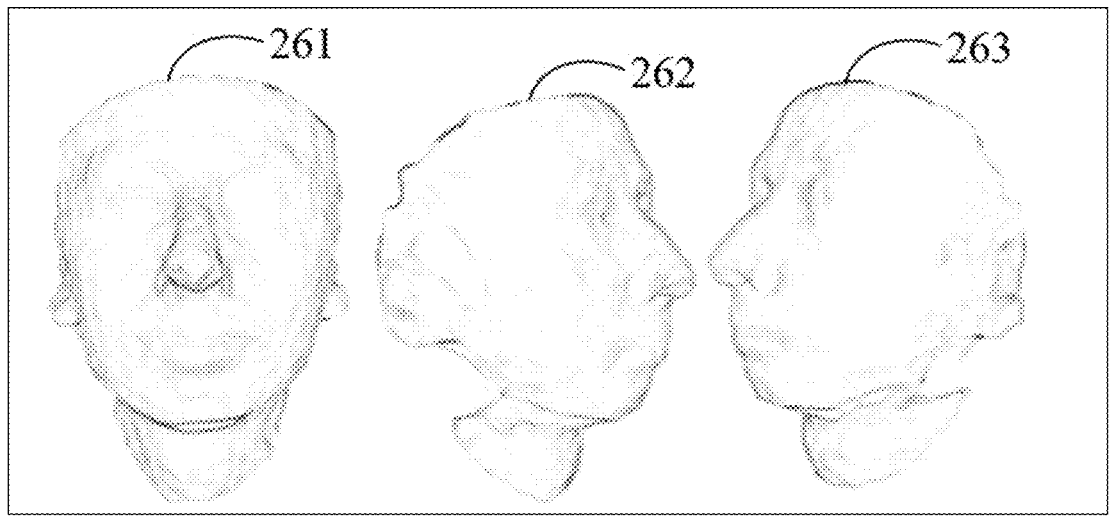
FIG. 10 is a schematic diagram of a three-dimensional contour model according to an embodiment of this application.

The point cloud data includes a plurality of points, and each point includes three-dimensional coordinates. The regional depth image corresponding to each target face image includes the depth information of each pixel. According to two-dimensional coordinates of each pixel in the regional depth image and the depth information of each pixel in each regional depth image, three-dimensional coordinates of each pixel can be determined, so that each regional depth image is converted into the point cloud data. In addition, because the target face image is obtained by the depth camera using a focal length value to capture the face, the target face image is obtained by scaling down and imaging a real face. A distance between each pixel in the regional depth image and the depth camera can be determined by using the coordinates of each pixel determined in the target face image. The distance between each pixel and the depth camera is processed by using the focal length value corresponding to the target face image, so that a real distance between a position point corresponding to each pixel and the depth camera can be determined, real distances between a plurality of position points can be determined, and each regional depth image is converted into the point cloud data to match the real face. Therefore, the point cloud data corresponding to the plurality of image types are fused, so as to obtain a three-dimensional contour model matching the real face. The generated three-dimensional contour model is shown in FIG. 10. In FIG. 10, the three-dimensional contour model 261 is a front face of the three-dimensional contour model, the three-dimensional contour model 262 is a right face of the three-dimensional contour model, and the three-dimensional contour model 263 is a left face of the three-dimensional contour model. In some embodiments, the regional depth image is converted into the point cloud data by using a Surfel model.

In some embodiments, the plurality of target face images include a first face image corresponding to the front face type and a second face image corresponding to another image type. Step 2061 further includes: rotating second point cloud data corresponding to each second face image by a posture angle difference between each second face image and the first face image; and fusing each piece of second point cloud data obtained after rotation and first point cloud data corresponding to the first face image, to generate the three-dimensional contour model.

Another image type is the left face type, the right face type, or the head-up type. There is a posture angle difference between the second face image corresponding to another image type and the first face image, and positions of the face corresponding to the regional depth images corresponding to different image types are different. Therefore, to avoid overlap of point cloud data belonging to different positions, each piece of second point cloud data needs to be rotated, so that a posture angle difference between the point cloud data obtained after rotation and the first point cloud data is 0. When each piece of second point cloud data is fused with the first point cloud data, each piece of second point cloud data obtained after rotation is fused with the first point cloud data by superimposing the same pixel points in each second point cloud data and in the first point cloud data, to generate the three-dimensional contour model.

In some embodiments, in the process of fusing a plurality of pieces of point cloud data, the plurality of pieces of point cloud data is fused by using a truncated signed distance function (TSDF). After the three-dimensional contour model is generated, processing such as denoising, down-sampling, Poisson reconstruction, and Laplacian smoothing need to be performed on the three-dimensional contour model, to finally obtain a complete three-dimensional contour model.

2062. Respectively extract color texture features of the regional face images from the plurality of target face images.

Because each target face image includes a plurality of pixels, and each pixel has a corresponding color feature, color features of the plurality of pixels in each regional face image are extracted, and the color features of the plurality of pixels are used as the color texture features. In some embodiments, when the color texture features are extracted from the regional face image, algorithms such as a Local binary patterns (LBP) algorithm and a gray-level co-occurrence matrix algorithm are used.

2063. Fuse the color texture features of the regional face images and the three-dimensional contour model, to generate the three-dimensional face model.

The color texture features of the regional face images are respectively fused with the three-dimensional contour model, so that a corresponding color texture feature is displayed in each region on the three-dimensional contour model, thereby generating the three-dimensional face model.

In one embodiment, step 2063 includes: determining a region corresponding to each regional face image in the three-dimensional contour model; and respectively fusing the color texture features of the regional face images into surfaces of corresponding regions in the three-dimensional contour model, to generate the three-dimensional face model.

Figure 11:
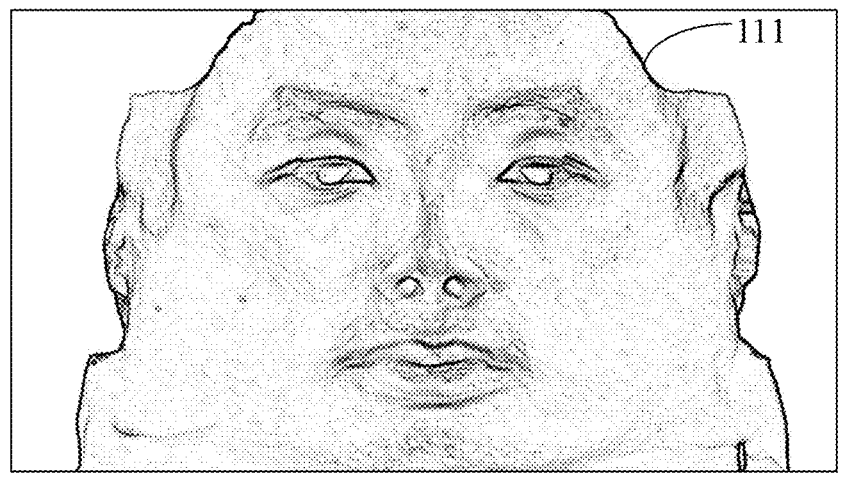
FIG. 11 is a schematic diagram of a three-dimensional contour model according to an embodiment of this application.
Figure 12:
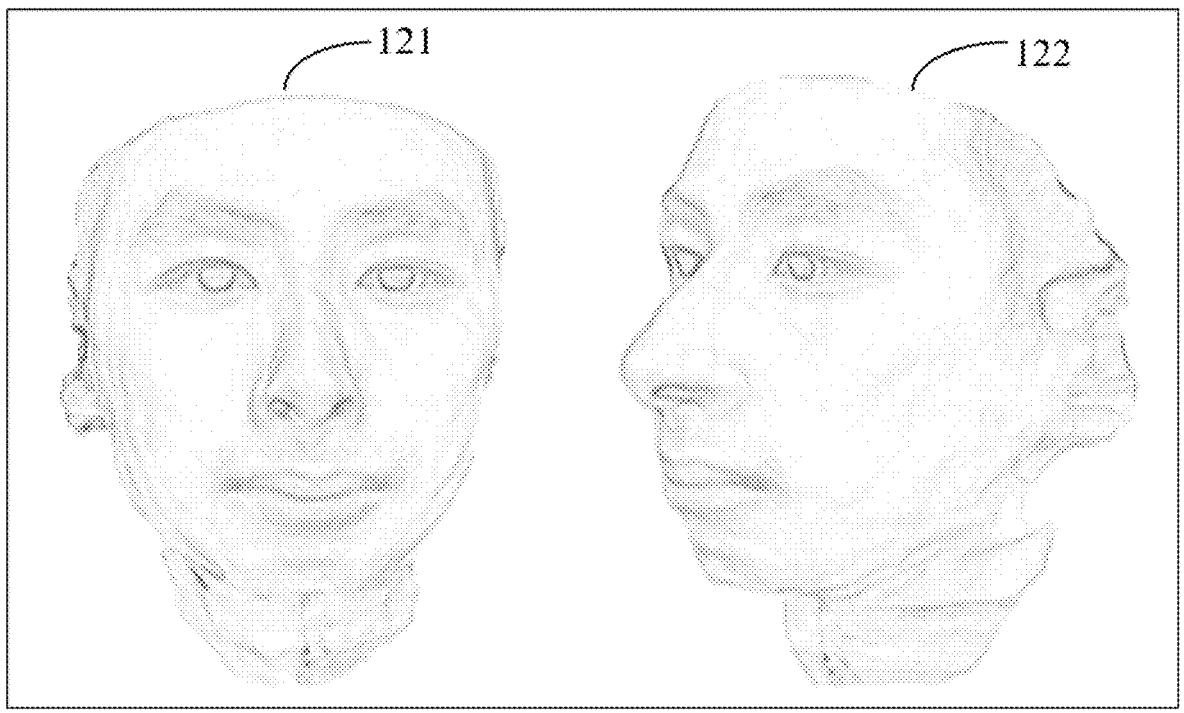
FIG. 12 is a schematic diagram of a three-dimensional face model according to an embodiment of this application.

In addition, step 2063 further includes: fusing the color texture features of the regional face images, to obtain an unfolded image of the color texture feature of the face, and inputting the unfolded image of the color texture feature and the three-dimensional contour model into a rendering engine, to obtain the three-dimensional face model after performing rendering by the rendering engine. FIG. 11 shows an unfolded image 111 of the color texture feature of the face. A three-dimensional face model obtained after being rendered is shown in FIG. 12. The three-dimensional face model 121 is a front face image, and the three-dimensional face model 122 is a left face image.

In the method provided in this embodiment of this application, by obtaining a regional face image that is in each target face image and that matches an image type of each target face image, face images of other regions in the target face image are cropped, so that each obtained regional face image and a corresponding regional depth image include only a region matching the image type of each target face image, not including a region matching another image type, and an overlapping region between different regional face images is reduced. Image fusion is performed according to the plurality of obtained regional face images and the plurality of obtained regional depth images, and a calculation amount is small in a process of generating a three-dimensional face model, thereby improving the efficiency of constructing the three-dimensional face model.

Moreover, the plurality of target face images include a face image of a head-up type, so that the generated three-dimensional face model can include a chin region and a neck region of a face, thereby improving the integrity of the generated three-dimensional face model.

In addition, by sifting a plurality of obtained face images and selecting the plurality of target face images, the number of face images required to construct the three-dimensional face model is reduced, so that when the plurality of target face images are subsequently transmitted, the transmission efficiency of the face images is improved. Furthermore, because the number of face images that need to be processed is reduced through sifting, the calculation amount for processing is reduced, thereby improving the efficiency of constructing the three-dimensional face model.

In addition, by determining eye statuses of the plurality of obtained face images, face images in an unblinking state are sifted, so that the number of face images obtained after being sifted is reduced, so that the calculation amount in the process of generating the three-dimensional face model by using the face images obtained after being sifted is small. In addition, because the face images in the unblinking state include more eye information, generating the three-dimensional face model based on the face images in the unblinking state can improve the integrity of the generated three-dimensional face model.

This embodiment of this application is described by determining the target face image by dividing the plurality of obtained face images into the plurality of image sequences. However, in another embodiment, there is no need to perform steps 201 to 203, the plurality of obtained face images and the plurality of corresponding depth images are directly used as the plurality of target face images and the plurality of corresponding depth images; or, a plurality of target faces and a plurality of corresponding depth images that are transmitted by another device may alternatively be obtained.

Figure 13:
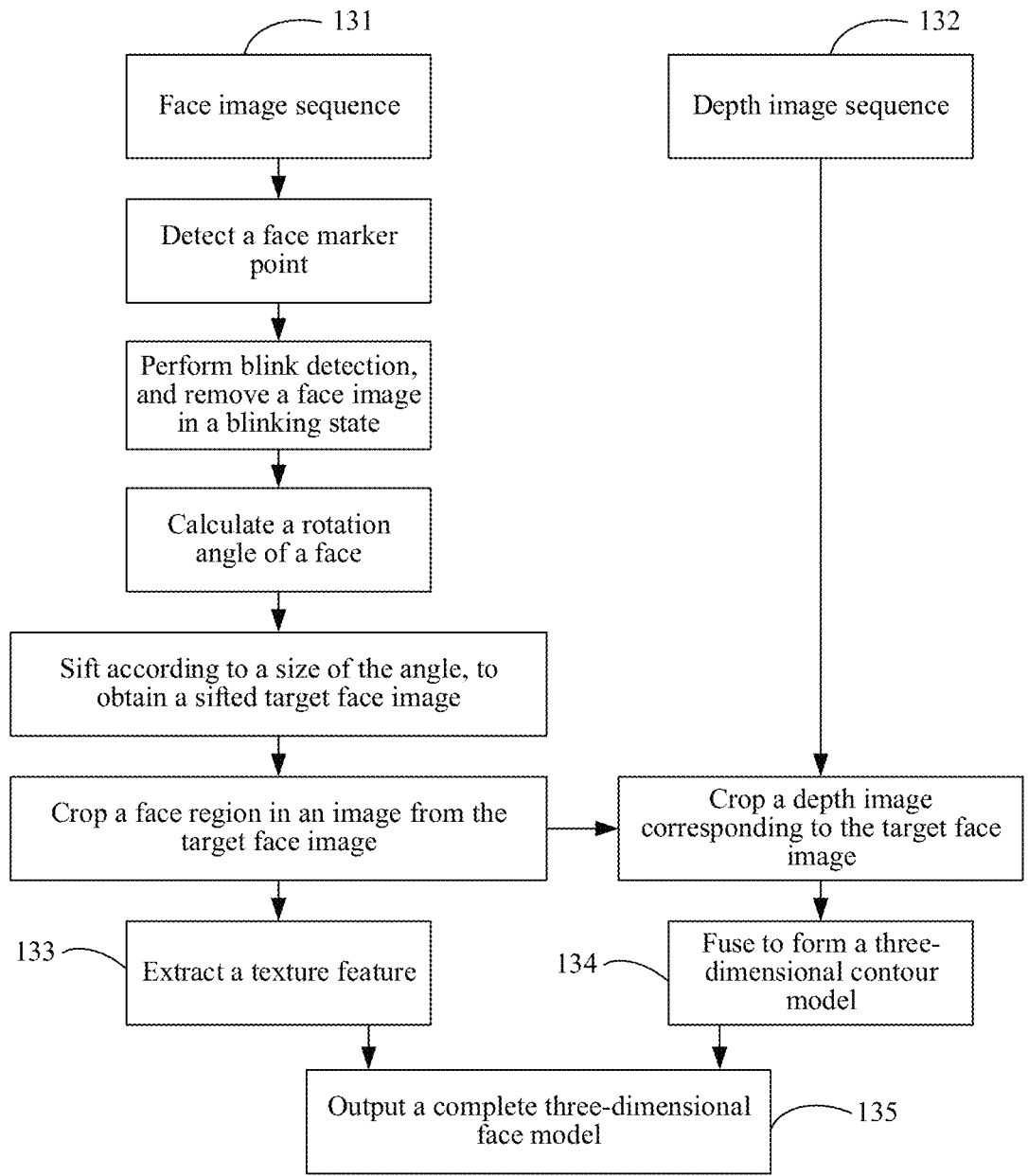
FIG. 13 is a flowchart of a method for generating a three-dimensional face model according to an embodiment of this application.

FIG. 13 is a flowchart of a method for generating a three-dimensional face model according to an embodiment of this application. The process includes the following steps:
1. A computer device captures face images by using a depth camera to obtain a face image sequence and a corresponding depth image sequence.
2. Perform marker point detection on the face images in the face image sequence, to determine marker points of the face images.
3. Remove the face images in a blinking state from the face image sequence according to coordinates of face marker points in eye regions of the face images, to obtain a new face image sequence.
4. Determine a front face image according to face marker points included in each face image in the new face image sequence, and determine a rotation angle of a face in each face image according to coordinates of the face marker points in the front face image and coordinates of face marker points in other face images.
5. Divide the face images in the new face image sequence into a plurality of image sequences according to a size of an angle corresponding to each face image, different image sequences matching different image types.
6. Sift a face image with the largest angle from the image sequences according to the size of the angle, to obtain a sifted target face image.
7. Crop, from the target face image, a face region corresponding to an image type of the target face image, and crop a corresponding depth region from a corresponding depth image.
8. Extract a texture feature of the face region, and fuse a plurality of depth regions, to obtain a three-dimensional contour model.
9. Fuse the texture feature of the face region into the three-dimensional contour model, to output a complete three-dimensional face model.

Figure 14:
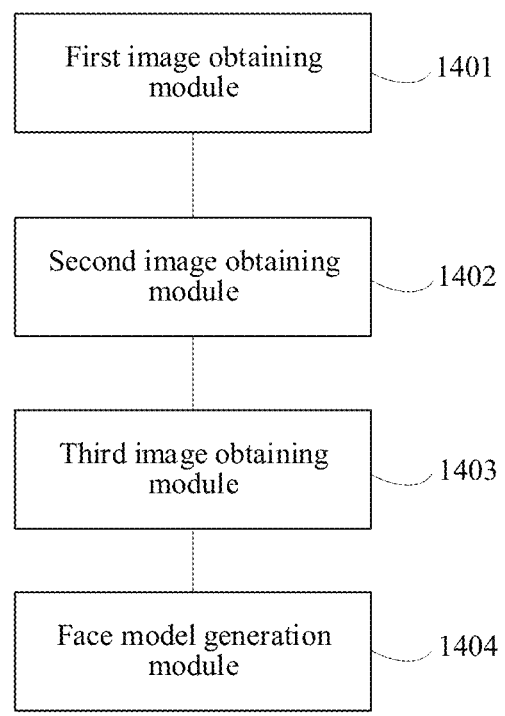
FIG. 14 is a schematic structural diagram of an apparatus for generating a three-dimensional face model according to an embodiment of this application.

FIG. 14 is a schematic structural diagram of an apparatus for generating a three-dimensional face model according to an embodiment of this application. As shown in FIG. 14, the apparatus includes:
a first image obtaining module 1401, configured to obtain a plurality of target face images and a plurality of depth images corresponding to the plurality of target face images, the plurality of target face images including a same face, and the plurality of depth images including depth information corresponding to pixels in the target face images;
a second image obtaining module 1402, configured to obtain, according to an image type of each target face image, a regional face image that is in each target face image and that matches the image type of each target face image, the image type including a front face type, a left face type, a right face type, or a head-up type;
a third image obtaining module 1403, configured to obtain a regional depth image in a corresponding depth image according to the regional face image in each target face image, a position of the regional face image matching a position of the regional depth image; and
a face model generation module 1404, configured to perform image fusion according to the plurality of obtained regional face images and the plurality of obtained regional depth images, to generate a three-dimensional face model of the face.

In the apparatus provided in this embodiment of this application, by cropping the plurality of obtained target face images and the plurality of obtained regional depth images, each obtained regional face image and a corresponding regional depth image include only a region matching the image type of each target face image, not including a region matching another image type, and an overlapping region between different regional face images is reduced. Image fusion is performed according to the plurality of obtained regional face images and the plurality of obtained regional depth images, and a calculation amount is small in a process of generating a three-dimensional face model, thereby improving the efficiency of constructing the three-dimensional face model.

Figure 15:
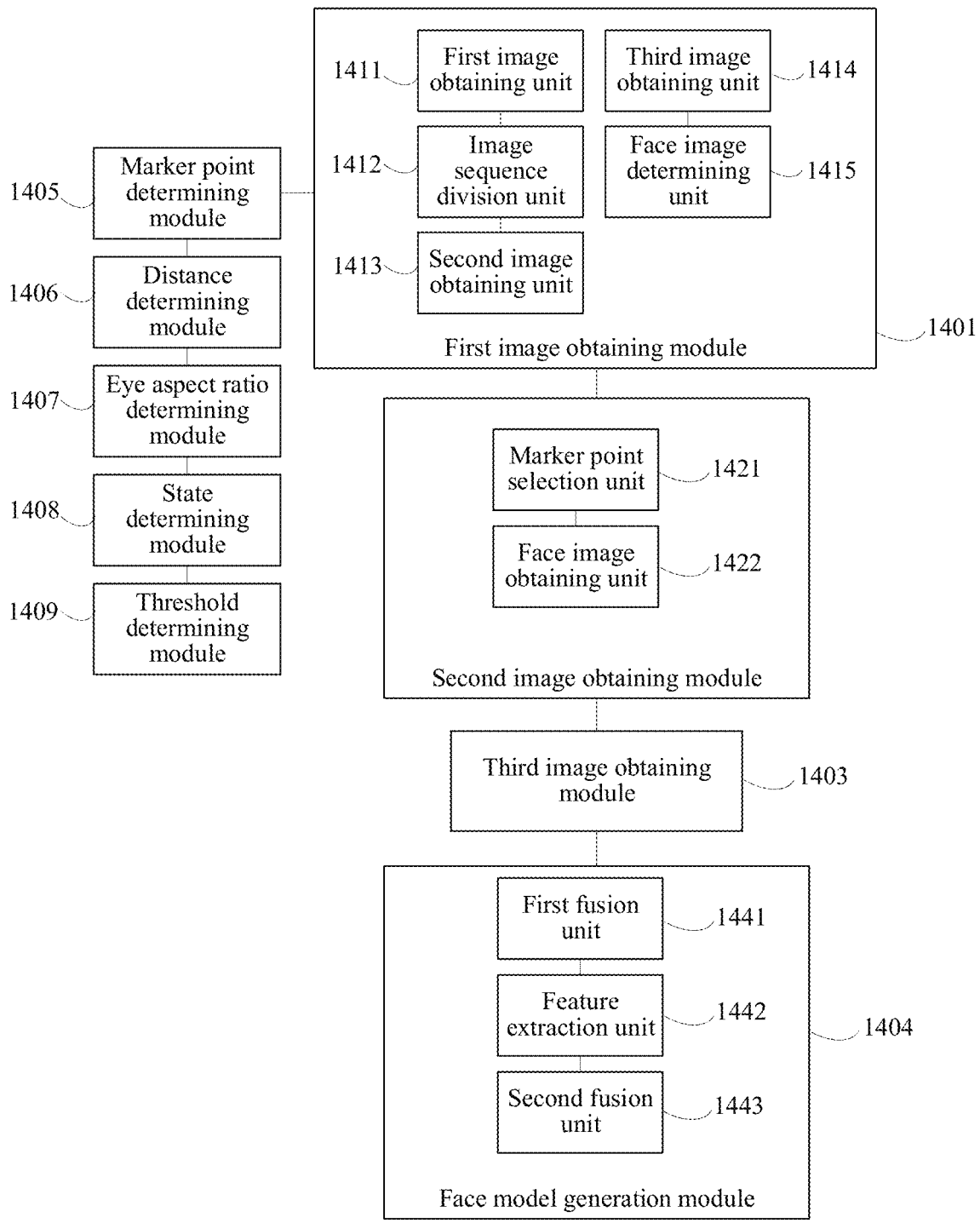
FIG. 15 is a schematic structural diagram of an apparatus for generating a three-dimensional face model according to an embodiment of this application.

In some embodiments, as shown in FIG. 15, the second image obtaining module 1402 includes:
a marker point selection unit 1421, configured to select, from a plurality of marker points in a target face image, at least one first marker point matching an image type of the target face image; and
a face image obtaining unit 1422, configured to obtain a regional face image formed by the at least one first marker point from the target face image.

In some embodiments, as shown in FIG. 15, the first image obtaining module 1401 includes:
- a first image obtaining unit 1411, configured to obtain a plurality of face images and a plurality of depth images corresponding to the plurality of face images, the plurality of face images including the face; and
- an image sequence division unit 1412, configured to classify the plurality of face images according to image types of the plurality of face images, to obtain a plurality of image sequences, each image sequence including face images of a same image type; and
- a second image obtaining unit 1413, configured to select a target face image from each image sequence, to obtain the plurality of target face images, and obtain the depth images corresponding to the plurality of target face images.

In some embodiments, the plurality of image sequences include at least a first image sequence corresponding to the front face type and second image sequences corresponding to other image types, and the second image obtaining unit 1413 is further configured to select a first face image from the first image sequence as the target face image; obtain a posture angle difference between each second face image in each second image sequence and the first face image; and select a second face image with a largest posture angle difference from each second image sequence as the target face image.

In some embodiments, the second image obtaining unit 1413 is further configured to determine, for a second face image, at least one second marker point in the second face image and at least one second marker point in the first face image that have a same serial number; obtain a rotation and translation matrix between the first face image and the second face image according to coordinates of the at least one second marker point in the first face image and coordinates of the at least one second marker point in the second face image; and convert the rotation and translation matrix, to obtain a posture angle difference between the second face image and the first face image.

In some embodiments, as shown in FIG. 15, the first image obtaining module 1401 includes:
- a third image obtaining unit 1414, configured to obtain a plurality of face images and a plurality of depth images corresponding to the plurality of face images, the plurality of face images including the face; and
- a face image determining unit 1415, configured to determine a face image in an unblinking state in the plurality of face images as the target face image according to an eye status of the face image, the eye status including a blinking state or the unblinking state.

In some embodiments, as shown in FIG. 15, the apparatus further includes:
- a marker point determining module 1405, configured to determine, for a face image, an upper eyelid marker point, a lower eyelid marker point, a left canthus marker point, and a right canthus marker point of a target eye region in the face image;
- a distance determining module 1406, configured to determine a first distance between the upper eyelid marker point and the lower eyelid marker point, and a second distance between the left canthus marker point and the right canthus marker point;
- an eye aspect ratio determining module 1407, configured to determine a ratio of the first distance to the second distance as an eye aspect ratio of the target eye region; and
- a state determining module 1408, configured to determine that the face image is in the blinking state in response to the eye aspect ratio being less than an eye aspect ratio threshold; and
- the state determining module 1408, being further configured to determine that the face image is in the unblinking state in response to the eye aspect ratio being not less than the eye aspect ratio threshold.

In some embodiments, as shown in FIG. 15, the apparatus further includes:
- a threshold determining module 1409, configured to obtain a mean value of eye aspect ratios corresponding to the plurality of face images as the eye aspect ratio threshold.

In some embodiments, as shown in FIG. 15, the face model generation module 1404 includes:
- a first image fusion unit 1441, configured to fuse the plurality of regional depth images, to obtain a three-dimensional contour model;
- a feature extraction unit 1442, configured to respectively extract color texture features of the regional face images from the plurality of target face images; and
- a second image fusion unit 1443, configured to fuse the color texture features of the regional face images and the three-dimensional contour model, to generate the three-dimensional face model.

In some embodiments, the first image fusion unit 1441 is further configured to convert the regional depth images corresponding to the target face images into point cloud data according to focal length values corresponding to the target face images; and fuse the point cloud data corresponding to the target face images, to obtain the three-dimensional contour model.

In some embodiments, the plurality of target face images include a first face image corresponding to the front face type and second face images corresponding to other image types, and the first image fusion unit 1441 is further configured to rotate second point cloud data corresponding to each second face image by a posture angle difference between each second face image and the first face image; and fuse each piece of second point cloud data obtained after rotation and first point cloud data corresponding to the first face image, to generate the three-dimensional contour model.

In some embodiments, the second image fusion unit 1443 is further configured to determine a region corresponding to each regional face image in the three-dimensional contour model; and respectively fuse the color texture features of the regional face images into surfaces of corresponding regions in the three-dimensional contour model, to generate the three-dimensional face model of the face.

The division of the foregoing functional modules is merely described for exemplary purposes when the apparatus for generating a three-dimensional face model provided in the foregoing embodiments generates a three-dimensional face model. In actual applications, the functions may be allocated to different functional modules according to specific requirements. That is, the internal structure of the computer device is divided into different functional modules to complete all or some of the foregoing described functions. In addition, the apparatus for generating a three-dimensional face model provided in the foregoing embodiments and the method embodiments for generating a three-dimensional face model belong to one conception. For the specific implementation process, refer to the method embodiments. Details are not described herein again.

Figure 16:
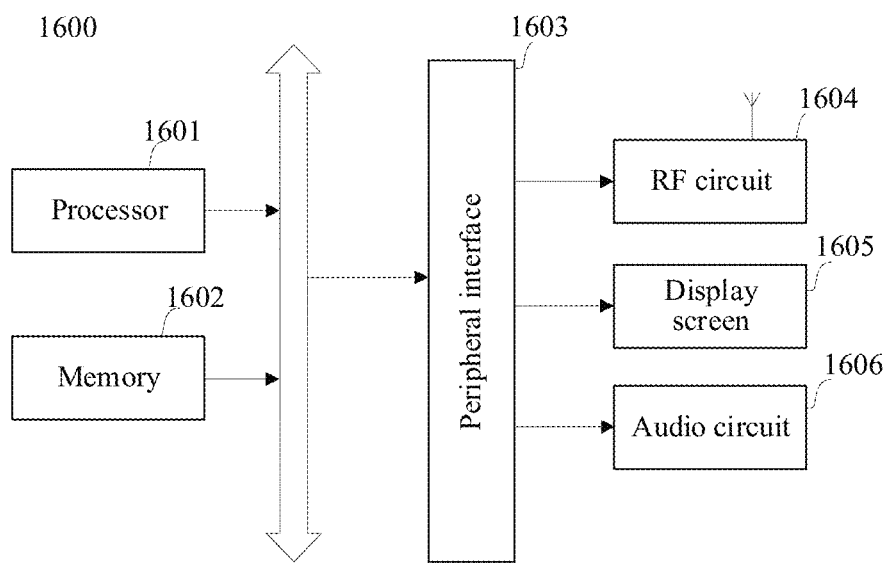
FIG. 16 is a schematic structural diagram of a terminal according to an embodiment of this application.

FIG. 16 is a schematic structural diagram of a terminal according to an embodiment of this application, which can implement the operations performed by the computer device in the foregoing embodiments. In some embodiments, the terminal 1600 is a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, a smart television, a smart speaker, a smart remote control, a smart microphone, or any another smart terminal. The terminal 1600 may also be referred to as a user equipment, a portable terminal, a laptop terminal, a desktop terminal, or another name.

Generally, the terminal 1600 includes a processor 1601 and a memory 1602.

The processor 1601 may include one or more processing cores, and may be, for example, a 4-core processor or an 8-core processor. The memory 1602 may include one or more computer-readable storage media, the one or more computer-readable storage media may be non-transient, and configured to store at least one computer program, the at least one computer program being configured to be included in the processor 1601 to implement the method for generating a three-dimensional face model provided in the method embodiments of this application.

In some embodiments, the terminal 1600 may in some embodiments further include: a peripheral interface 1603 and at least one peripheral. The processor 1601, the memory 1602, and the peripheral interface 1603 may be connected by using a bus or a signal cable. Each peripheral may be connected to the peripheral interface 1603 by using a bus, a signal cable, or a circuit board. In some embodiments, the peripheral includes: at least one of a radio frequency (RF) circuit 1604, a display screen 1605, and an audio circuit 1606.

The RF circuit 1604 is configured to receive and transmit an RF signal, also referred to as an electromagnetic signal. The radio frequency circuit 1604 communicates with a communication network and another communication device by using the electromagnetic signal.

The display screen 1605 is configured to display a user interface (UI). The UI may include a graphic, text, an icon, a video, and any combination thereof. The display screen 1605 may be a touch display screen, or may be further configured to provide a virtual button and/or a virtual keyboard.

The audio circuit 1606 may include a microphone and a loudspeaker. The microphone is configured to acquire sound audio signals of a user and an environment, and convert the audio signals into electrical signals and input the electrical signals into the processor 1601 for processing, or input the electrical signals into the RF circuit 1604 to implement speech communication. For a purpose of stereo acquisition or noise reduction, there may be a plurality of microphones disposed at different portions of the terminal 1600 respectively. The microphone may further be an array microphone or an omni-directional collection type microphone. The speaker is configured to convert electrical signals from the processor 1601 or the RF circuit 1604 into audio signals.

A person skilled in the art may understand that a structure shown in FIG. 16 constitutes no limitation on the terminal 1600, and the terminal may include more or fewer components than those shown in the figure, or some components may be combined, or a different component deployment may be used.

Figure 17:
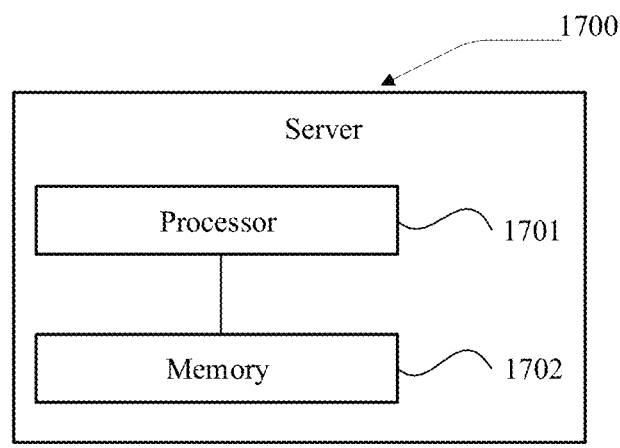
FIG. 17 is a schematic structural diagram of a server according to an embodiment of this application.

FIG. 17 is a schematic structural diagram of a server according to an embodiment of this application. The server 1700 may vary greatly due to different configurations or performance, and may include one or more processors (such as central processing units (CPUs)) 1701 and one or more memories 1702. The memory 1702 stores at least one computer program, the at least one computer program being loaded and executed by the processor 1701 to implement the methods provided in the foregoing method embodiments. Certainly, the server may also have a wired or wireless network interface, a keyboard, an input/output interface and other components to facilitate input/output. The server may also include other components for implementing device functions.

Details are not described herein again.

The server 1700 may be configured to perform the steps performed by the computer device in the method for generating a three-dimensional face model provided in the foregoing embodiments.

The embodiments of this application further provide a computer device, including a processor and a memory, the memory storing at least one computer program, the at least one computer program being loaded and executed by the processor to implement the following operations in the method for generating a three-dimensional face model:
    obtaining a plurality of target face images and a plurality of depth images corresponding to the plurality of target face images, the plurality of target face images including a same face, and the plurality of depth images including depth information corresponding to pixels in the target face images;
    obtaining, according to an image type of each target face image, a regional face image that is in each target face image and that matches the image type of each target face image, the image type including a front face type, a left face type, a right face type, or a head-up type;
    obtaining a regional depth image in a corresponding depth image according to the regional face image in each target face image, a position of the regional face image matching a position of the regional depth image; and
    performing image fusion according to the plurality of obtained regional face images and the plurality of obtained regional depth images, to generate a three-dimensional face model of a face.

In some embodiments, the at least one computer program is further loaded and executed by the processor to implement the following operations:
    selecting, from a plurality of marker points in a target face image, at least one first marker point matching an image type of the target face image; and
    obtaining a regional face image formed by the at least one first marker point from the target face image.

In some embodiments, the at least one computer program is further loaded and executed by the processor to implement the following operations:
    obtaining a plurality of face images and a plurality of depth images corresponding to the plurality of face images, the plurality of face images including the face;
    classifying the plurality of face images according to image types of the plurality of face images, to obtain a plurality of image sequences, each image sequence including face images of a same image type; and
    selecting a target face image from each image sequence, to obtain the plurality of target face images, and obtaining the depth images corresponding to the plurality of target face images.

In some embodiments, the plurality of image sequences include at least a first image sequence corresponding to the front face type and second image sequences corresponding to other image types. The at least one computer program code is further loaded and executed by the processor to implement the following operations:
  selecting a first face image from the first image sequence as the target face image;
  obtaining a posture angle difference between each second face image in each second image sequence and the first face image; and
  selecting a second face image with a largest posture angle difference from each second image sequence as the target face image.

In some embodiments, the at least one computer program is further loaded and executed by the processor to implement the following operations:
  determining, for a second face image, at least one second marker point in the second face image and at least one second marker point in the first face image that have a same serial number;
  obtaining a rotation and translation matrix between the first face image and the second face image according to coordinates of the at least one second marker point in the first face image and coordinates of the at least one second marker point in the second face image; and
  converting the rotation and translation matrix, to obtain a posture angle difference between the second face image and the first face image.

In some embodiments, the at least one computer program is further loaded and executed by the processor to implement the following operations:
  obtaining a plurality of face images and a plurality of depth images corresponding to the plurality of face images, the plurality of face images including the face;
  determining a face image in an unblinking state in the plurality of face images as the target face image according to an eye status of the face image, the eye status including a blinking state or the unblinking state.

In some embodiments, the at least one computer program is further loaded and executed by the processor to implement the following operations:
  determining, for a face image, an upper eyelid marker point, a lower eyelid marker point, a left canthus marker point, and a right canthus marker point of a target eye region in the face image;
  determining a first distance between the upper eyelid marker point and the lower eyelid marker point, and a second distance between the left canthus marker point and the right canthus marker point;
  determining a ratio of the first distance to the second distance as an eye aspect ratio of the target eye region;
  determining that the face image is in the blinking state in response to the eye aspect ratio being less than an eye aspect ratio threshold; and
  determining that the face image is in the unblinking state in response to the eye aspect ratio being not less than the eye aspect ratio threshold.

In some embodiments, the at least one computer program is further loaded and executed by the processor to implement the following operations:
  obtaining a mean value of eye aspect ratios corresponding to the plurality of face images as the eye aspect ratio threshold.

In some embodiments, the at least one computer program is further loaded and executed by the processor to implement the following operations:
  fusing the plurality of regional depth images, to obtain a three-dimensional contour model;
  respectively extracting color texture features of the regional face images from the plurality of target face images; and
  fusing the color texture features of the regional face images and the three-dimensional contour model, to generate the three-dimensional face model.

In some embodiments, the at least one computer program is further loaded and executed by the processor to implement the following operations:
  converting the regional depth images corresponding to the target face images into point cloud data according to focal length values corresponding to the target face images; and
  fusing the point cloud data corresponding to the target face images, to obtain the three-dimensional contour model.

In some embodiments, the plurality of target face images include a first face image corresponding to the front face type and second face images corresponding to other image types. The at least one computer program code is further loaded and executed by the processor to implement the following operations:
  rotating second point cloud data corresponding to each second face image by a posture angle difference between each second face image and the first face image; and
  fusing each piece of second point cloud data obtained after rotation and first point cloud data corresponding to the first face image, to generate the three-dimensional contour model.

In some embodiments, the at least one computer program is further loaded and executed by the processor to implement the following operations:
  determining a region corresponding to each regional face image in the three-dimensional contour model; and
  respectively fusing the color texture features of the regional face images into surfaces of corresponding regions in the three-dimensional contour model, to generate the three-dimensional face model of the face.

The embodiments of this application further provide a computer-readable storage medium, storing at least one computer program, the at least one computer program being loaded and executed by a processor to implement the following operations in the method for generating a three-dimensional face model.

obtaining a plurality of target face images and a plurality of depth images corresponding to the plurality of target face images, the plurality of target face images including a same face, and the plurality of depth images including depth information corresponding to pixels in the target face images;

obtaining, according to an image type of each target face image, a regional face image that is in each target face image and that matches the image type of each target face image, the image type including a front face type, a left face type, a right face type, or a head-up type;

obtaining a regional depth image in a corresponding depth image according to the regional face image in each target face image, a position of the regional face image matching a position of the regional depth image; and performing image fusion according to the plurality of obtained regional face images and the plurality of obtained regional depth images, to generate a three-dimensional face model of a face.

In some embodiments, the at least one computer program is further loaded and executed by the processor to implement the following operations:

selecting, from a plurality of marker points in a target face image, at least one first marker point matching an image type of the target face image; and obtaining a regional face image formed by the at least one first marker point from the target face image.

In some embodiments, the at least one computer program is further loaded and executed by the processor to implement the following operations:

obtaining a plurality of face images and a plurality of depth images corresponding to the plurality of face images, the plurality of face images including the face;

classifying the plurality of face images according to image types of the plurality of face images, to obtain a plurality of image sequences, each image sequence including face images of a same image type; and selecting a target face image from each image sequence, to obtain the plurality of target face images, and obtaining the depth images corresponding to the plurality of target face images.

In some embodiments, the plurality of image sequences include at least a first image sequence corresponding to the front face type and second image sequences corresponding to other image types. The at least one computer program code is further loaded and executed by the processor to implement the following operations:

selecting a first face image from the first image sequence as the target face image;

obtaining a posture angle difference between each second face image in each second image sequence and the first face image; and selecting a second face image with a largest posture angle difference from each second image sequence as the target face image.

In some embodiments, the at least one computer program is further loaded and executed by the processor to implement the following operations:

determining, for a second face image, at least one second marker point in the second face image and at least one second marker point in the first face image that have a same serial number;

obtaining a rotation and translation matrix between the first face image and the second face image according to coordinates of the at least one second marker point in the first face image and coordinates of the at least one second marker point in the second face image; and converting the rotation and translation matrix, to obtain a posture angle difference between the second face image and the first face image.

In some embodiments, the at least one computer program is further loaded and executed by the processor to implement the following operations:

obtaining a plurality of face images and a plurality of depth images corresponding to the plurality of face images, the plurality of face images including the face;

determining a face image in an unblinking state in the plurality of face images as the target face image according to an eye status of the face image, the eye status including a blinking state or the unblinking state.

In some embodiments, the at least one computer program is further loaded and executed by the processor to implement the following operations:

determining, for a face image, an upper eyelid marker point, a lower eyelid marker point, a left canthus marker point, and a right canthus marker point of a target eye region in the face image;

determining a first distance between the upper eyelid marker point and the lower eyelid marker point, and a second distance between the left canthus marker point and the right canthus marker point;

determining a ratio of the first distance to the second distance as an eye aspect ratio of the target eye region;

determining that the face image is in the blinking state in response to the eye aspect ratio being less than an eye aspect ratio threshold; and determining that the face image is in the unblinking state in response to the eye aspect ratio being not less than the eye aspect ratio threshold.

In some embodiments, the at least one computer program is further loaded and executed by the processor to implement the following operations:

obtaining a mean value of eye aspect ratios corresponding to the plurality of face images as the eye aspect ratio threshold.

In some embodiments, the at least one computer program is further loaded and executed by the processor to implement the following operations:

fusing the plurality of regional depth images, to obtain a three-dimensional contour model;

respectively extracting color texture features of the regional face images from the plurality of target face images; and fusing the color texture features of the regional face images and the three-dimensional contour model, to generate the three-dimensional face model.

In some embodiments, the at least one computer program is further loaded and executed by the processor to implement the following operations:

converting the regional depth images corresponding to the target face images into point cloud data according to focal length values corresponding to the target face images; and fusing the point cloud data corresponding to the target face images, to obtain the three-dimensional contour model.

In some embodiments, the plurality of target face images include a first face image corresponding to the front face type and second face images corresponding to other image types. The at least one computer program code is further loaded and executed by the processor to implement the following operations:

rotating second point cloud data corresponding to each second face image by a posture angle difference between each second face image and the first face image; and fusing each piece of second point cloud data obtained after rotation and first point cloud data corresponding to the first face image, to generate the three-dimensional contour model.

In some embodiments, the at least one computer program is further loaded and executed by the processor to implement the following operations:

determining a region corresponding to each regional face image in the three-dimensional contour model; and respectively fusing the color texture features of the regional face images into surfaces of corresponding regions in the three-dimensional contour model, to generate the three-dimensional face model of the face.

The embodiments of this application further provide a computer program product or a computer program, the computer program product or the computer program including computer program code, the computer program code being stored in a computer-readable storage medium, a processor of a computer device reading the computer program code from the computer-readable storage medium, and the processor executing the computer program code to implement the following operations in the method for generating a three-dimensional face model as described in the above aspect.

obtaining a plurality of target face images and a plurality of depth images corresponding to the plurality of target face images, the plurality of target face images including a same face, and the plurality of depth images including depth information corresponding to pixels in the target face images;

obtaining, according to an image type of each target face image, a regional face image that is in each target face image and that matches the image type of each target face image, the image type including a front face type, a left face type, a right face type, or a head-up type;

obtaining a regional depth image in a corresponding depth image according to the regional face image in each target face image, a position of the regional face image matching a position of the regional depth image; and performing image fusion according to the plurality of obtained regional face images and the plurality of obtained regional depth images, to generate a three-dimensional face model of a face.

In some embodiments, the at least one computer program code is further loaded and executed by the processor to implement the following operations:

selecting, from a plurality of marker points in any target face image, at least one first marker point matching an image type of the target face image; and obtaining a regional face image formed by the at least one first marker point from the target face image.

In some embodiments, the at least one computer program code is further loaded and executed by the processor to implement the following operations:

obtaining a plurality of face images and a plurality of depth images corresponding to the plurality of face images, the plurality of face images including the face;

classifying the plurality of face images according to image types of the plurality of face images, to obtain a plurality of image sequences, each image sequence including face images of a same image type; and selecting a target face image from each image sequence, to obtain the plurality of target face images, and obtaining the depth images corresponding to the plurality of target face images.

In some embodiments, the plurality of image sequences include at least a first image sequence corresponding to the front face type and second image sequences corresponding to other image types. The at least one computer program code is further loaded and executed by the processor to implement the following operations:

selecting a first face image from the first image sequence as the target face image;

obtaining a posture angle difference between each second face image in each second image sequence and the first face image; and selecting a second face image with a largest posture angle difference from each second image sequence as the target face image.

In some embodiments, the at least one computer program code is further loaded and executed by the processor to implement the following operations:

determining, for any second face image, at least one second marker point in the second face image and at least one second marker point in the first face image that have a same serial number;

obtaining a rotation and translation matrix between the first face image and the second face image according to coordinates of the at least one second marker point in the first face image and coordinates of the at least one second marker point in the second face image; and converting the rotation and translation matrix, to obtain a posture angle difference between the second face image and the first face image.

In some embodiments, the at least one computer program code is further loaded and executed by the processor to implement the following operations:

obtaining a plurality of face images and a plurality of depth images corresponding to the plurality of face images, the plurality of face images including the face;

determining a face image in an unblinking state in the plurality of face images as the target face image according to an eye status of the face image, the eye status including a blinking state or the unblinking state.

In some embodiments, the at least one computer program code is further loaded and executed by the processor to implement the following operations:

determining, for a face image, an upper eyelid marker point, a lower eyelid marker point, a left canthus marker point, and a right canthus marker point of a target eye region in the face image;

determining a first distance between the upper eyelid marker point and the lower eyelid marker point, and a second distance between the left canthus marker point and the right canthus marker point;

determining a ratio of the first distance to the second distance as an eye aspect ratio of the target eye region;

determining that the face image is in the blinking state in response to the eye aspect ratio being less than an eye aspect ratio threshold; and determining that the face image is in the unblinking state in response to the eye aspect ratio being not less than the eye aspect ratio threshold.

In some embodiments, the at least one computer program code is further loaded and executed by the processor to implement the following operations:

obtaining a mean value of eye aspect ratios corresponding to the plurality of face images as the eye aspect ratio threshold.

In some embodiments, the at least one computer program code is further loaded and executed by the processor to implement the following operations:

fusing the plurality of regional depth images, to obtain a three-dimensional contour model;

respectively extracting color texture features of the regional face images from the plurality of target face images; and fusing the color texture features of the regional face images and the three-dimensional contour model, to generate the three-dimensional face model.

In some embodiments, the at least one computer program code is further loaded and executed by the processor to implement the following operations:

converting the regional depth images corresponding to the target face images into point cloud data according to focal length values corresponding to the target face images; and fusing the point cloud data corresponding to the target face images, to obtain the three-dimensional contour model.

In some embodiments, the plurality of target face images include a first face image corresponding to the front face type and second face images corresponding to other image types. The at least one computer program code is further loaded and executed by the processor to implement the following operations:

rotating second point cloud data corresponding to each second face image by a posture angle difference between each second face image and the first face image; and fusing each piece of second point cloud data obtained after rotation and first point cloud data corresponding to the first face image, to generate the three-dimensional contour model.

In some embodiments, the at least one computer program code is further loaded and executed by the processor to implement the following operations:

determining a region corresponding to each regional face image in the three-dimensional contour model; and respectively fusing the color texture features of the regional face images into surfaces of corresponding regions in the three-dimensional contour model, to generate the three-dimensional face model of the face.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing related hardware. The program may be stored on a computer-readable storage medium. The storage medium may be a ROM, a magnetic disk, or an optical disc.

The foregoing descriptions are merely exemplary embodiments of the embodiments of this application, but are not intended to limit the embodiments of this application. Any modification, equivalent replacement, or improvement made within the spirit and principle of the embodiments of this application shall fall within the protection scope of this application.

What is claimed is:

1. A method for generating a three-dimensional face model, applied to a computer device, the method comprising:

obtaining a plurality of target face images, comprising:
obtaining a plurality of face images that comprise a same face;
classifying the plurality of face images according to image types of the plurality of face images, to obtain a plurality of image sequences, each image sequence comprising face images of a same image type, wherein the image type comprises a front face type, a left face type, a right face type, or a head-up type, the plurality of image sequences comprise at least a first image sequence corresponding to the front face type and at least a second image sequences corresponding to an other image type;
selecting a first face image from the first image sequence as one of the target face images;
obtaining posture angle differences between second face images in each second image sequence and the first face image; and
selecting, among the second face images in one second image sequence based on the posture angle differences, a second face image with a largest posture angle difference as one of the target face images;

obtaining a plurality of depth images corresponding to the plurality of target face images, the plurality of depth images comprising depth information corresponding to pixels in the target face images;

obtaining, according to an image type of each target face image, a regional face image that is in each target face image and that corresponds to the image type of each target face image;

obtaining a regional depth image in a corresponding depth image according to the regional face image; and performing image fusion based on the plurality of obtained regional face images and the plurality of obtained regional depth images, to generate a three-dimensional face model.

2. The method according to claim 1, wherein the obtaining, according to an image type of each target face image, a regional face image that is in each target face image and that corresponds to the image type of each target face image comprises:

selecting, from a plurality of marker points in a target face image, at least one first marker point corresponding to an image type of the target face image; and obtaining a regional face image formed by the at least one first marker point from the target face image.

3. The method according to claim 1, wherein the obtaining a posture angle difference between second face images in each second image sequence and the first face image comprises:

determining, for a second face image, at least one second marker point in the second face image and at least one second marker point in the first face image that have a same serial number;

obtaining a rotation and translation matrix between the first face image and the second face image according to coordinates of the at least one second marker point in the first face image and coordinates of the at least one second marker point in the second face image; and converting the rotation and translation matrix, to obtain a posture angle difference between the second face image and the first face image.

4. The method according to claim 1, wherein the obtaining a plurality of target face images and a plurality of depth images corresponding to the plurality of target face images comprises:

obtaining a plurality of face images and a plurality of depth images corresponding to the plurality of face images, the plurality of face images comprising the face; and determining a face image in an unblinking state in the plurality of face images as the target face image according to an eye status of the face image, the eye status comprising a blinking state or the unblinking state.

5. The method according to claim 4, wherein before the determining a face image in an unblinking state in the plurality of face images as the target face image according to an eye status of the face image, the method further comprises:
determining, for a face image, an upper eyelid marker point, a lower eyelid marker point, a left canthus marker point, and a right canthus marker point of a target eye region in the face image;
determining a first distance between the upper eyelid marker point and the lower eyelid marker point, and a second distance between the left canthus marker point and the right canthus marker point;
determining a ratio of the first distance to the second distance as an eye aspect ratio of the target eye region;
determining that the face image is in the blinking state in response to the eye aspect ratio being less than an eye aspect ratio threshold; and
determining that the face image is in the unblinking state in response to the eye aspect ratio being not less than the eye aspect ratio threshold.

6. The method according to claim 5, wherein the method further comprises:
obtaining a mean value of eye aspect ratios corresponding to the plurality of face images as the eye aspect ratio threshold.

7. The method according to claim 1, wherein the performing image fusion according to the plurality of obtained regional face images and the plurality of obtained regional depth images, to generate a three-dimensional face model of the face comprises:
fusing the plurality of regional depth images, to obtain a three-dimensional contour model;
respectively extracting color texture features of the regional face images from the plurality of target face images; and
fusing the color texture features of the regional face images and the three-dimensional contour model, to generate the three-dimensional face model.

8. The method according to claim 7, wherein the fusing the plurality of regional depth images, to obtain a three-dimensional contour model comprises:
converting the regional depth images corresponding to the target face images into point cloud data according to focal length values corresponding to the target face images; and
fusing the point cloud data corresponding to the target face images, to obtain the three-dimensional contour model.

9. The method according to claim 8, wherein the plurality of target face images comprise a first face image corresponding to the front face type and second face images corresponding to other image types, and the fusing the point cloud data corresponding to the target face images, to obtain the three-dimensional contour model comprises:
rotating second point cloud data corresponding to each second face image by a posture angle difference between each second face image and the first face image; and
fusing each piece of second point cloud data obtained after rotation and first point cloud data corresponding to the first face image, to generate the three-dimensional contour model.

10. The method according to claim 7, wherein the fusing the color texture features of the regional face images and the three-dimensional contour model, to generate the three-dimensional face model comprises:
determining a region corresponding to each regional face image in the three-dimensional contour model; and
respectively fusing the color texture features of the regional face images into surfaces of corresponding regions in the three-dimensional contour model, to generate the three-dimensional face model.

11. An apparatus for generating a three-dimensional face model, comprising a processor and a memory, the memory storing at least one computer program, the at least one computer program being loaded and executed by the processor to:
obtain a plurality of target face images, comprising:
obtaining a plurality of face images that comprise a same face;
classifying the plurality of face images according to image types of the plurality of face images, to obtain a plurality of image sequences, each image sequence comprising face images of a same image type, wherein the image type comprises a front face type, a left face type, a right face type, or a head-up type, the plurality of image sequences comprise at least a first image sequence corresponding to the front face type and at least a second image sequences corresponding to an other image type;
selecting a first face image from the first image sequence as one of the target face images;
obtaining posture angle differences between second face images in each second image sequence and the first face image; and
selecting, among the second face images in one second image sequence based on the posture angle differences, a second face image with a largest posture angle difference as one of the target face images;
obtain a plurality of depth images corresponding to the plurality of target face images, the plurality of depth images comprising depth information corresponding to pixels in the target face images;
obtain, according to an image type of each target face image, a regional face image that is in each target face image and that corresponds to the image type of each target face image;
obtain a regional depth image in a corresponding depth image according to the regional face image in each target face image, a position of the regional face image corresponding to a position of the regional depth image; and
perform image fusion according to the plurality of obtained regional face images and the plurality of obtained regional depth images, to generate a three-dimensional face model of the face.

12. A non-transitory computer-readable storage medium, storing at least one computer program, the computer program being loaded and executed by a processor to implement:
obtaining a plurality of target face images, comprising:
obtaining a plurality of face images that comprise a same face;
classifying the plurality of face images according to image types of the plurality of face images, to obtain a plurality of image sequences, each image sequence comprising face images of a same image type, wherein the image type comprises a front face type, a left face type, a right face type, or a head-up type, the plurality of image sequences comprise at least a first image sequence corresponding to the front face type and at least a second image sequences corresponding to an other image type;

selecting a first face image from the first image sequence as one of the target face images;

obtaining posture angle differences between second face images in each second image sequence and the first face image; and selecting, among the second face images in one second image sequence based on the posture angle differences, a second face image with a largest posture angle difference as one of the target face images;

obtaining a plurality of depth images corresponding to the plurality of target face images, the plurality of depth images comprising depth information corresponding to pixels in the target face images;

obtaining, according to an image type of each target face image, a regional face image that is in each target face image and that corresponds to the image type of each target face image;

obtaining a regional depth image in a corresponding depth image according to the regional face image; and performing image fusion based on the plurality of obtained regional face images and the plurality of obtained regional depth images, to generate a three-dimensional face model.

13. The computer-readable storage medium according to claim 12, wherein the obtaining, according to an image type of each target face image, a regional face image that is in each target face image and that corresponds to the image type of each target face image comprises:

selecting, from a plurality of marker points in a target face image, at least one first marker point corresponding to an image type of the target face image; and obtaining a regional face image formed by the at least one first marker point from the target face image.

14. The computer-readable storage medium according to claim 12, wherein the obtaining a posture angle difference between second face images in each second image sequence and the first face image comprises:

determining, for a second face image, at least one second marker point in the second face image and at least one second marker point in the first face image that have a same serial number;

obtaining a rotation and translation matrix between the first face image and the second face image according to coordinates of the at least one second marker point in the first face image and coordinates of the at least one second marker point in the second face image; and converting the rotation and translation matrix, to obtain a posture angle difference between the second face image and the first face image.

15. The computer-readable storage medium according to claim 12, wherein the obtaining a plurality of target face images and a plurality of depth images corresponding to the plurality of target face images comprises:

obtaining a plurality of face images and a plurality of depth images corresponding to the plurality of face images, the plurality of face images comprising the face; and determining a face image in an unblinking state in the plurality of face images as the target face image according to an eye status of the face image, the eye status comprising a blinking state or the unblinking state.

16. The computer-readable storage medium according to claim 15, wherein before the determining a face image in an unblinking state in the plurality of face images as the target face image according to an eye status of the face image, the method further comprises:

determining, for a face image, an upper eyelid marker point, a lower eyelid marker point, a left canthus marker point, and a right canthus marker point of a target eye region in the face image;

determining a first distance between the upper eyelid marker point and the lower eyelid marker point, and a second distance between the left canthus marker point and the right canthus marker point;

determining a ratio of the first distance to the second distance as an eye aspect ratio of the target eye region;

determining that the face image is in the blinking state in response to the eye aspect ratio being less than an eye aspect ratio threshold; and determining that the face image is in the unblinking state in response to the eye aspect ratio being not less than the eye aspect ratio threshold.

* * * * *